US010608807B2

(12) United States Patent
Mihelic

(10) Patent No.: US 10,608,807 B2
(45) Date of Patent: *Mar. 31, 2020

(54) SYSTEMS AND METHODS OF CLOCK SYNCHRONIZATION BETWEEN DEVICES ON A NETWORK

(71) Applicant: Aviat U.S., Inc., Austin, TX (US)

(72) Inventor: Janez Mihelic, Ljubljana (SI)

(73) Assignee: Aviat U.S., Inc., Austin, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/913,847

(22) Filed: Mar. 6, 2018

(65) Prior Publication Data

US 2018/0198599 A1 Jul. 12, 2018

Related U.S. Application Data

(63) Continuation of application No. 15/138,172, filed on Apr. 25, 2016, now Pat. No. 9,912,465, which is a
(Continued)

(51) Int. Cl.
*G06F 1/12* (2006.01)
*G06F 13/42* (2006.01)
(Continued)

(52) U.S. Cl.
CPC ............. *H04L 7/0033* (2013.01); *G06F 1/10* (2013.01); *G06F 1/12* (2013.01); *H04J 3/0667* (2013.01); *H04L 43/0852* (2013.01)

(58) Field of Classification Search
CPC .................................................. H04L 7/0033
See application file for complete search history.

(56) References Cited

U.S. PATENT DOCUMENTS 5,530,846 A 6/1996 Strong
6,373,834 B1 4/2002 Lundh
(Continued)

FOREIGN PATENT DOCUMENTS

EP 2312775 4/2011

OTHER PUBLICATIONS

Na, Chongning et al., "Optimal Estimation and Control of Clock Synchronization Following the Precision Time Protocol," 2010 IEEE International Conference on Control Applications (CCA), pp. 1767-1772, Sep. 8, 2010.
(Continued)

*Primary Examiner* — Mohammed H Rehman
(74) *Attorney, Agent, or Firm* — Sheppard, Mullin, Richter & Hampton LLP

(57) ABSTRACT

An exemplary method of synchronizing a master clock and a slave clock comprises transmitting a plurality of packets between a master device and a slave device, calculating a first skew between a first pair of the plurality of packets at the slave device and a second skew between the first pair at the master device, calculating a ratio between the first skew and the second skew, providing a slave clock frequency correction to the slave device, calculating a first packet trip delay using a time that the master device initiates sending a packet to the slave device, a time the master device receives a response from the slave device, a corrected time the slave device receives the packet, and a corrected time the slave device initiates sending the response, calculating a first offset based on the first packet trip delay, and providing the first offset to the slave device.

19 Claims, 31 Drawing Sheets

Related U.S. Application Data continuation of application No. 13/555,064, filed on Jul. 20, 2012, now Pat. No. 9,335,785.

(60) Provisional application No. 61/509,971, filed on Jul. 20, 2011.

(51) Int. Cl.
  *H04L 7/00* (2006.01)
  *H04J 3/06* (2006.01)
  *G06F 1/10* (2006.01)
  *H04L 12/26* (2006.01)

(56) References Cited

U.S. PATENT DOCUMENTS

| | | | |
|---|---|---|---|
| 7,023,816 | B2 | 4/2006 | Couillard |
| 7,139,748 | B1 * | 11/2006 | Mills ............... G06F 16/273 707/612 |
| 7,483,448 | B2 | 1/2009 | Bhandari |
| 7,492,785 | B2 | 2/2009 | Seligman |
| 7,773,606 | B2 * | 8/2010 | Dobjelevski .......... H04J 3/0697 370/395.62 |
| 8,335,240 | B2 | 12/2012 | Boduch |
| 8,819,472 | B1 | 8/2014 | Muscha |
| 8,949,648 | B2 | 2/2015 | Peng |
| 2001/0019581 | A1 | 9/2001 | Agazzi |
| 2002/0157031 | A1 | 10/2002 | Lin |
| 2003/0041274 | A1 | 2/2003 | Platteter |
| 2003/0117899 | A1 | 6/2003 | Eidson |
| 2004/0223515 | A1 | 11/2004 | Rygielski |
| 2005/0201421 | A1 | 9/2005 | Bhandari |
| 2005/0207339 | A1 | 9/2005 | Beshai |
| 2006/0184614 | A1 * | 8/2006 | Baratto ............... G06F 3/14 709/203 |
| 2006/0288165 | A1 * | 12/2006 | Rosenbloom .......... H04L 67/06 711/115 |
| 2007/0300094 | A1 | 12/2007 | Frazier et al. |
| 2008/0080567 | A1 | 4/2008 | Radulescu |
| 2008/0231297 | A1 * | 9/2008 | Kang ............... G01R 31/31725 324/750.02 |
| 2008/0244094 | A1 | 10/2008 | Rich |
| 2009/0034672 | A1 | 2/2009 | Cho |
| 2009/0147806 | A1 | 6/2009 | Brueckheimer |
| 2009/0276542 | A1 | 11/2009 | Aweya |
| 2010/0002683 | A1 | 1/2010 | Miljkovic |
| 2010/0135328 | A1 | 6/2010 | Sasson |
| 2010/0185781 | A1 | 7/2010 | Anderson |
| 2011/0035511 | A1 | 2/2011 | Biederman |
| 2011/0075685 | A1 | 3/2011 | Xu |
| 2011/0134766 | A1 * | 6/2011 | Zampetti ............... H04J 3/0682 370/252 |
| 2011/0185216 | A1 | 7/2011 | Zhao |

OTHER PUBLICATIONS

European Patent Application No. 12846053.2, Search Report dated Apr. 7, 2015.

International Application No. PCT/US2012/047756, International Search Report and Written Opinion dated Apr. 11, 2013.

\* cited by examiner

| switch num | traffic [%] | traffic type | std dev | min Off[ns] | max Off[ns] | Mean off[ns] | max ΔMPD[ns] | Sync msgs/s | time[s] |
|---|---|---|---|---|---|---|---|---|---|
| 1 | 0 | / | 31.3 | -210 | 103 | -39.1 | 140 | 8 | 10658 |
| 1 | 0 | / | 28.7 | -210 | 214.5 | -37.6 | 140 | 8 | 1000000 |
| 1 | 100 | UDP | 38.7 | -242 | 143 | -38.3 | 140 | 8 | 474880 |
| 1 | 10 | UDP | 33.5 | -227 | 181 | -40.9 | 140 | 8 | 12141 |
| 1 | 20 | UDP | 99.6 | -497 | 489 | -38.2 | 140 | 8 | 8214 |
| 2 | 0 | / | 150 | -497 | 501 | -33.2 | 180 | 8 | 3832 |
| 2 | 0 | / | 70 | -570 | 516 | -36 | 180 | 8 | 9300 |
| 2 | 20 | UDP | 70 | -418 | 320 | -38.6 | 180 | 8 | 48329 |
| 2 | 50 | UDP | 125 | -998 | 1000 | -44.6 | 180 | 50 | 23387 |
| 2 | 0 | / | 39.2 | -259 | 129 | -44.6 | 180 | 50 | 6916 |
| 2 | 20 | UDP | 38.5 | -263 | 107 | -42.5 | 180 | 50 | 6939 |
| 2 | 50 | UDP | 150 | -1525 | 2495 | -35.7 | 180 | 50 | 9395 |
| 2 | 50 | UDP | 39.3 | -274 | 239 | -43 | 180 | 50 | 223256 |
| 2 | 80 | UDP | 38.4 | -491 | 480 | -43.7 | 180 | 50 | 23670 |
| 2 | 80 | UDP | 39.5 | -491 | 490 | -43.1 | 180 | 50 | 83030 |
| 3 | 0 | / | 65.7 | -112 | 491 | 179 | 180 | 50 | 12461 |
| 1 | 20 | UDP | 19.9 | -43 | 314 | 169 | 180 | 50 | 85568 |
| 1 | 50 | UDP | 20.5 | -55 | 380 | 188 | 180 | 50 | 86695 |
| 1 | 80 | UDP | 20.4 | -69 | 332 | 168 | 180 | 50 | 82583 |

FIG. 12

Max delta mean path delay = 140
1. 8 sync msg/s, 1 switch between master and slave varOff = 9.796e-016
stdDev = 31.3ns
minOff = -210ns
maxOff = 103ns
meanOff = -39.1ns
deltaNS1 = 313ns
measureNum = 10658

3. 8 sync msg/s, 1 switch between master and slave, 100Mbit/s UDP forced traffic
varOff=8.22e-016
stdDev=28.7ns
minOff=-242ns
maxOff=143ns
meanOff=-38.3ns
deltaNS1=385ns
measureNum = 47480

4. 8 sync msg/s, 1 switch between master and slave, 10Mbit/s broadcast UDP forced traffic
varOff=1.123e-015
stdDev=33.5ns
minOff=-227ns
maxOff=181ns
meanOff=-40.9ns
deltaNS1=408ns
measureNum = 12141

5. 8 sync msg/s, 1 switch between master and slave, 20Mbit/s broadcast UDP forced traffic
varOff= 9.93e-015
stdDev= 99.6ns
minOff= -497ns
maxOff= 489ns
meanOff= -38.8ns
deltaNS1= 986
measureNum = 8214

6. 8 sync msg/s, 2 switches between master and slave
varOff=2.23e-014
stdDev=150ns
minOff=-497ns
maxOff=501ns
meanOff=-33.2ns
deltaNS1=998ns
measureNum = 3832

Max delta mean path delay = 180ns
1.      8 sync msg/s,  2 switches between master and slave
varOff=4.91e-015
stdDev=70ns
minOff=-570ns
maxOff=516ns
meanOff=-36ns
deltaNS1=1086ns
measureNum = 9300

2. 8 sync msg/s, 2 switches between master and slave, 20Mbit/s UDP forced traffic
varOff=3.84e-015
stdDev=70ns
minOff=-418ns
maxOff=320ns
meanOff=-38.6ns
deltaNS1=738ns
measureNum = 48329

3.   8 sync msg/s, 2 switches between master and slave, 50Mbit/s UDP forced traffic
varOff=1.57e-014
stdDev=125ns
minOff=-998ns
maxOff=1000ns
meanOff=-44.6ns
deltaNS1=1998ns
measureNum = 23387

4. 50 sync msg/s, 2 switches between master and slave
varOff=1.53604e-015
stdDev=39.2ns
minOff=-259ns
maxOff=129ns
meanOff=-44.6ns
deltaNS1=388ns
measureNum = 6916

5. 50 sync msg/s, 2 switches between master and slave, 20Mbit/s UDP forced traffic
varOff=1.48247e-015
stdDev=38.5ns
minOff=-263ns
maxOff=107ns
meanOff=-42.5ns
deltaNS1=370ns
measureNum = 6939

6. 50 sync msg/s, 2 switches between master and slave, 50Mbit/s UDP forced traffic varOff=2.26e-014
stdDev=150ns
minOff=-1525ns
maxOff=2495ns
meanOff=-35.7ns
deltaNS1=4020ns
measureNum = 9395

7. 50 sync msg/s, 2 switches between master and
slave, 50Mbit/s UDP forced traffic (2nd)
varOff=1.55e-015
stdDev=39.3ns
minOff=-274ns
maxOff=229ns
meanOff=-43ns
deltaNS1=503ns
measureNum = 223236

8. 50 sync msg/s, 2 switches between master and slave, 80Mbit/s UDP forced traffic varOff=1.47456e-015
stdDev=3.84000e-008
minOff=-4.91000e-007
maxOff=4.90000e-007
meanOff=-4.27995e-008
deltaNS1=9.81000e+002
measureNum = 23670

9. 50 sync msg/s, 2 switches between master and slave, 80Mbit/s UDP forced traffic (2nd)
varOff=1.56e-015
stdDev=39.5ns
minOff=-491ns
maxOff=490ns
meanOff = -43.1ns
deltaNS1 = 981ns
measureNum = 83030

10. 50 sync msg/s, 3 switches between master and slave, 0Mbit/s UDP forced traffic
varOff=4.312e-015
stdDev=65.7ns
minOff=-112ns
maxOff=491ns
meanOff=179ns
deltaNS1=603ns
measureNum = 14461

12. 50 sync msg/s, 1 switch between master and slave, 50Mbit/s UDP forced traffic
varOff=4.19e-016
stdDev=20.5ns
minOff=-55ns
maxOff=360ns
meanOff=168ns
deltaNS1=415ns
measureNum = 86696

13. 50 sync msg/s, 1 switch between master and slave, 80Mbit/s UDP forced traffic
varOff=4.16e-016
stdDev=20.4ns
minOff=-69ns
maxOff=332ns
meanOff=168ns
deltaNS1=401ns
measureNum = 82583

SYSTEMS AND METHODS OF CLOCK SYNCHRONIZATION BETWEEN DEVICES ON A NETWORK

CROSS-REFERENCE TO RELATED APPLICATIONS

This application is a continuation of U.S. patent application Ser. No. 15/138,172, filed Apr. 25, 2016 and entitled "Systems and Methods of Clock Synchronization Between Devices on a Network," now U.S. Pat. No. 9,912,465, which is a continuation of U.S. patent application Ser. No. 13/555,064, filed Jul. 20, 2012 and entitled "Systems and Methods of Clock Synchronization Between Devices on a Network," now U.S. Pat. No. 9,335,785, which claims priority from U.S. Provisional Patent Application Ser. No. 61/509,971, filed Jul. 20, 2011 and entitled "IEEE 1588 Clock Servo Enhancement for Synchronization over Standard Network Elements," which are hereby incorporated by reference herein.

FIELD OF THE INVENTION(S)

The present invention(s) relate to synchronization, and more particularly, to systems and methods for network synchronization.

DESCRIPTION OF THE RELATED ART

Synchronized time information is important for distributed systems. Typically, a Precision Time Protocol (PTP) described in IEEE 1588 may be utilized to synchronize distributed clocks. The use of PTP has very low demands on local clocks and networks, however, in order to implement PTP, the components on the network must be configured (i.e., include additional hardware and/or firmware) to take advantage of PTP.

When a network consists of IEEE 1588 aware devices (i.e., boundary clocks or transparent clocks), very high precision can be obtained with very simple clock servo algorithms to determine rate adjustments and time corrections. Sophisticated processing is not necessary as only simple averaging or filtering of the protocol measurements is required. When a network consists of devices that are not IEEE 1588 aware, packet delay variation (PDV) is typically significant. A simple clock servo alone will not provide an accurate level of synchronization.

SUMMARY OF EMBODIMENTS

Various embodiments provide for systems and methods for network synchronization. In some embodiments, a method of synchronizing a master clock and a slave clock comprises transmitting a plurality of packets between a master device with the master clock and a slave device with the slave clock, calculating a first skew between a first pair of the plurality of packets at the slave device and a second skew between the first pair at the master device, calculating a ratio between the first skew and the second skew, providing a slave clock frequency correction of the slave clock to the slave device to allow the slave device to correct a slave clock frequency, calculating a first packet trip delay by using a time that the master device initiates sending a packet of the plurality of packets to the slave device, a time the master device receives a response from the slave device, a corrected time the slave device receives the packet, and a corrected time the slave device initiates sending the response, calculating a first offset between the master clock and the slave clock based on the first packet trip delay, and providing the first offset to the slave device.

The method may further comprise iterating steps of calculating an other skew between a subsequent pair of the plurality of packets at the slave device and a subsequent skew between the first pair at the master device and calculating a ratio between the other skew and the subsequent skew. In some embodiments, the method may further comprise calculating a third skew between a second pair of the plurality of packets at the slave device and a fourth skew between the second pair at the master device, calculating a ratio between the third skew and the fourth skew. Providing the slave clock frequency correction of the slave clock to the slave device may comprise providing the slave clock frequency correction of the slave clock to the slave device if the ratio between the first skew and the second skew approximates the ratio between the third skew and the fourth skew. The ratio between the first skew and the second skew may approximate the ratio between the third skew and the fourth skew when the difference between the ratios is less than a predetermined threshold.

In various embodiments, the method may comprise iteratively calculating subsequent packet trip delays utilizing a subset of the plurality of packets. The method may comprise determining a minimum value of the first and at least some subsequent packet trip delays. The method may further comprise obtaining a threshold relative to the minimum value of the first and subsequent packet trip delays, comparing one or more subsequent packet trip delays to the threshold relative to the minimum value of the first and subsequent packet trip delays, calculating a second offset based on the comparison, and providing the second offset between the master clock and the slave clock based on the first packet trip delay.

Calculating the first skew between the first pair of the plurality of packets at the slave device and the second skew between the first pair at the master device and calculating the ratio between the first skew and the second skew may comprise $Rms=(T_{22}-T_{21})/(T_{12}-T_{11})$ wherein Rms is the slave frequency rate, $T_{22}$ is a time that the slave device receives a second packet of the first pair from the master device, $T_{21}$ is a time that the slave device receives a first packet of the first pair from the master device, $T_{12}$ is a time the master device transmits the second packet of the second pair, and $T_{11}$ is a time the master device transmits the first packet of the second pair.

Calculating the third skew between a second pair of the plurality of packets at the slave device and the fourth skew between the second pair at the master device and calculating a ratio between the third skew and the fourth skew may comprise $Rsm=(T_{32}-T_{31})/(T_{42}-T_{41})$ wherein Rsm is a reverse slave frequency rate, $T_{32}$ is a time that the slave device transmits a second packet of the third pair from the master device, $T_{31}$ is a time that the slave device transmits a first packet of the third pair from the master device, $T_{42}$ is a time the master device receives the second packet of the second pair, and $T_{41}$ is a time the master device receives the first packet of the second pair.

Calculating a first packet trip delay by using the time that the master device initiates sending the packet of the plurality of packets to the slave device, the time the master device receives the response from the slave device, a corrected time the slave device receives the packet, and the corrected time the slave device initiates sending the response may comprise $$RTD = \frac{(T_4 - T_1) - (T_3 - T_2) \times R}{2}$$

wherein $T_4$ is the time that the master device receives the response form the slave device, $T_1$ is the time the master device initiates sending the packet to the slave device, $T_3$ is the time the slave device initiates sending the response, $T_2$ is the time the slave device receives the packet, and R is the ratio between the first skew and the second skew.

Calculating the first offset between the master clock and the slave clock based on the first packet trip delay may comprise offset=$T_2$-$T_1$-RTD wherein $T_2$ is the time the slave device receives the packet, $T_1$ is the time the master device initiates sending the packet to the slave device, and RTD is the first packet trip delay. Calculating the first offset between the master clock and the slave clock based on the first packet trip delay may comprise offset=$T_3$-$T_4$+meanRTD wherein $T_3$ is the time the slave device initiates sending the response, $T_4$ is the time that the master device receives the response form the slave device, and RTD is the first packet trip delay.

An exemplary system for synchronizing a master clock and a slave clock may comprise a communication module, a frequency rate module, a rate correction module, a packet trip delay module, and a time correction module. The communication module may be configured to transmit a plurality of packets between a master device with the master clock and a slave device with the slave clock. The frequency rate module may be configured to calculate a first skew based on times between a first pair of the plurality of packets received at the slave device and a second skew between the first pair at the master device and to calculate a ratio between the first skew and the second skew. The rate correction module may be configured to provide a slave clock frequency correction of the slave clock to the slave device to allow the slave device to correct a slave clock frequency. The packet trip delay module may be configured to calculate a first packet trip delay by using a time that the master device initiates sending a packet of the plurality of packets to the slave device, a time the master device receives a response from the slave device, a corrected time the slave device receives the packet, and a corrected time the slave device initiates sending the response. The time correction module may be configured to calculate a first offset between the master clock and the slave clock based on the first packet trip delay and to provide the first offset to the slave device.

An exemplary computer readable medium may executable instructions. The instructions may be executable by a processor to perform a method of synchronizing a master clock and a slave clock. The method may comprise transmitting a plurality of packets between a master device with the master clock and a slave device with the slave clock, calculating a first skew between a first pair of the plurality of packets at the slave device and a second skew between the first pair at the master device, calculating a ratio between the first skew and the second skew, providing a slave clock frequency correction of the slave clock to the slave device to allow the slave device to correct a slave clock frequency, calculating a first packet trip delay by using a time that the master device initiates sending a packet of the plurality of packets to the slave device, a time the master device receives a response from the slave device, a corrected time the slave device receives the packet, and a corrected time the slave device initiates sending the response, calculating a first offset between the master clock and the slave clock based on the first packet trip delay, and providing the first offset to the slave device.

Other features and aspects of various embodiments will become apparent from the following detailed description, taken in conjunction with the accompanying drawings, which illustrate, by way of example, the features of the various embodiments.

BRIEF DESCRIPTION OF THE DRAWINGS

FIG. 3 is a block diagram of a signal quality module for controlling both phase and gain of the signal in some embodiments.

FIG. 12 is a table including test data used in simulations related to test output FIGS. 13-31 utilizing some embodiments described herein.

DETAILED DESCRIPTION OF VARIOUS EMBODIMENTS

Various embodiments discussed herein describe a method of synchronization that provides accurate synchronization in networks with IEEE 1588 unaware network elements. In some embodiments, synchronization is achieved between end-to-end nodes (e.g., devices) where there is no IEEE 1588 support from the underlying network. In some embodiments, a sending and receive device is IEEE 1588 aware (i.e., a master and slave clock) but other elements of the underlying network are not IEEE 1588 aware.

In a network with non-IEEE 1588 capable components, packet delay between two or more network elements may range from a minimum physical delay up to a sum of the maximum delays through each communicating network element. In practice, there is usually a minimum transmission delay for each device and therefore a minimum total packet delay from the master to the slave. In various embodiments, some systems and methods described herein attempt to detect minimum delays, or "lucky packets," and use the results from these packets to make rate and time corrections.

Figure 1:
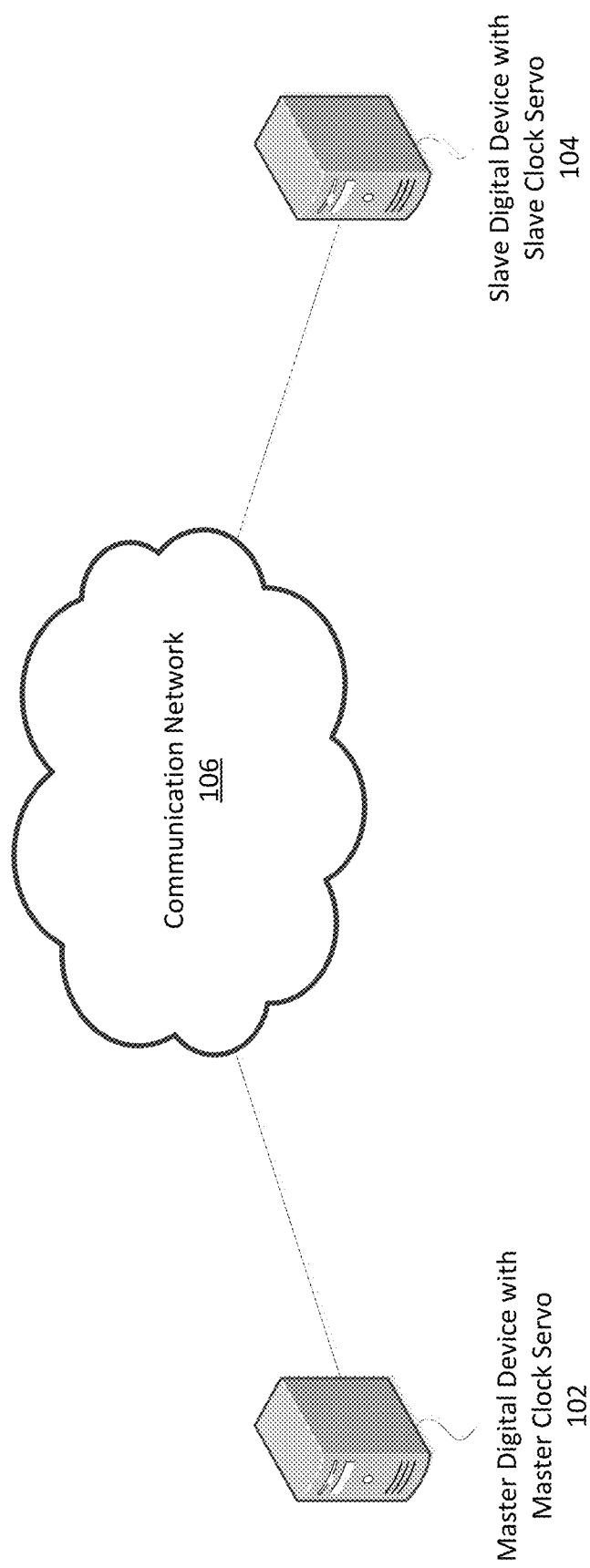
FIG. 1 is an exemplary environment including a master digital device with master clock servo and a slave digital device with slave clock servo communicating over a communication network in some embodiments.

FIG. 1 is an exemplary environment including a master digital device with master clock servo 102 and a slave digital device with slave clock servo 104 communicating over a communication network 106 in some embodiments. The master digital device 102 and slave digital device 104 may be both digital devices. A digital device is any device with a processor and memory. In some embodiments, the master digital device 102 and/or the slave digital device 104 may comprise base stations, mobile units, smartphones, personal computers, media devices, smart televisions, table computers, notebook computers, or the like. Digital devices are further described regarding FIG. 11.

The master digital device 102 comprises a master clock. A master clock is any clock, reference clock, or master clock servo that may be used for synchronization of the slave clock. The slave digital device 105 comprises a slave clock. The slave clock is any clock, slave clock, or slave clock servo that may be synchronized with the master clock.

In various embodiments, the master digital device 102 and the slave digital device 104 are IEEE 1588 aware. One or more components of the communication network 106 that relay or otherwise provides messages between the master digital device 102 and the slave digital device 104 may be IEEE 1588 unaware. In some embodiments, the master digital device 102 and/or the slave digital device 104 are not IEEE 1588 aware.

In some embodiments, the master digital device 102 and the slave digital device 104 or two digital devices of an LTE, WiMax, 4G, 3G, or other wireless network. For example, the master digital device 102 and the slave digital device 104 may comprise radio frequency units implemented within a microwave network. In some embodiments, the master digital device 102 may be a mobile station or subscriber station and the slave digital device 104 may be a base station. In another example, the master digital device 102 may be a base station and the slave digital device 104 may be another base station or server (e.g., access service network server or connectivity service network server) of the network. Those skilled in the art will appreciate that systems and methods described herein may be utilized over any wired or wireless network including Ethernet and WiFi networks.

The communication network 106 may be wireless, wired, or a combination of wireless and wired. The communication network 106 is any network configured to allow communication between any number of digital devices and/or network elements (e.g., routers, switches, bridges, servers, and/or hubs). The communication network 106 may be the Internet, a LAN, WAN, or any other network. The communication network 106 may be or comprise a microwave network.

The master digital device 102 may perform all or some of an exemplary synchronization method split into three stages: mean-PathDelay measurement, rate correction, and time correction. The stages may be performed in any order. Further, the stages are not necessarily performed in serial but all or some of any of the stages may be performed in parallel (e.g., simultaneously or nearly simultaneously).

One or more offset calculations (e.g., all offset calculations) may rely on Mean PathDelay (MPD) measurements. One or more rate calculation (e.g., all rate calculations) may also rely on the MPD measurements.

In general, the minimum MPD may be a relatively constant value. Reconfiguration of the network can cause step changes, but such reconfigurations may be infrequent. As a result, it is possible to detect a minimum MPD using long term tracking of minimum round-trip delays (i.e., full Sync–Delay_Req computation). In some embodiments, the implementation keeps a history of the last N MPD measurements and finds the minimum value over those measurements: minMPD(n)=min(MPD[1:n]).

In various embodiments, the master digital device 102 performs rate correction by measuring subsequent sync cycles, and determining a difference between a master measurement of the start of each message and a slave measurement of the arrival of each message. A ratio of the slave frequency versus the master may be used to correct for frequency differences.

In some embodiments, if all rate measurements were averaged, it might require hundreds or thousands of seconds for rate measurement to converge to a reasonable estimate to correct for frequency differences. Because of the long averaging time, frequency control by the master digital device 102 may be unable to adapt to short term frequency changes that might occur when using an inexpensive oscillator. In various embodiments, the master digital device 102 may utilize MPD measurements to detect low-latency packets. Subsequently, the master digital device 102 may utilize low-latency packets for detecting a rate of frequency offset. For example, if a packet meets the requirements for a short minimum round trip delay (i.e., a packet is sent from the master digital device 102 to the slave digital device 104 and a response is provided from the slave digital device 104 to the master digital device 102 in response to the packet), the rate may be measured by comparing the time from a previous "quick" packet. By using low-latency measurements, the convergence time for determining a frequency offset to the master device may be reduced.

In qualifying "quick" packets, there may be a trade-off between quality and quantity. For example, if the qualification is too restrictive, not enough information may be obtained to track frequency changes. In another example, if the qualification is not sufficiently restrictive, the rate calculations may include excessive variation.

In various embodiments, time offset determination utilizes a sync message to determine an offset versus a master. Some level of averaging or filtering may be used to smooth out corrections and avoid over correcting for each measurement. In some embodiments, a mechanism for time correction may make corrections using only delays if they are determined to be actual or approximate minimum packet trip delays. Utilizing the actual or approximate minimum packet trip delays may assist in preventing invalid corrections to the time value. In some embodiments, synchronization with sub-microsecond accuracy may be achieved.

The process is described in more detail herein.

Although only two devices are depicted in FIG. 1, those skilled in the art will appreciate that any number of digital devices may be synchronized to one or more digital devices. For example, the master digital device 102 may synchronize clocks of any number of slave digital devices. Further, a slave digital device may be synchronized with any number of master digital devices 102.

In some embodiments, the master digital device 102 and the slave digital device 104 are IEEE 1588 aware while one or more components of the communication network 106 are not IEEE 1588 aware.

Figure 2:
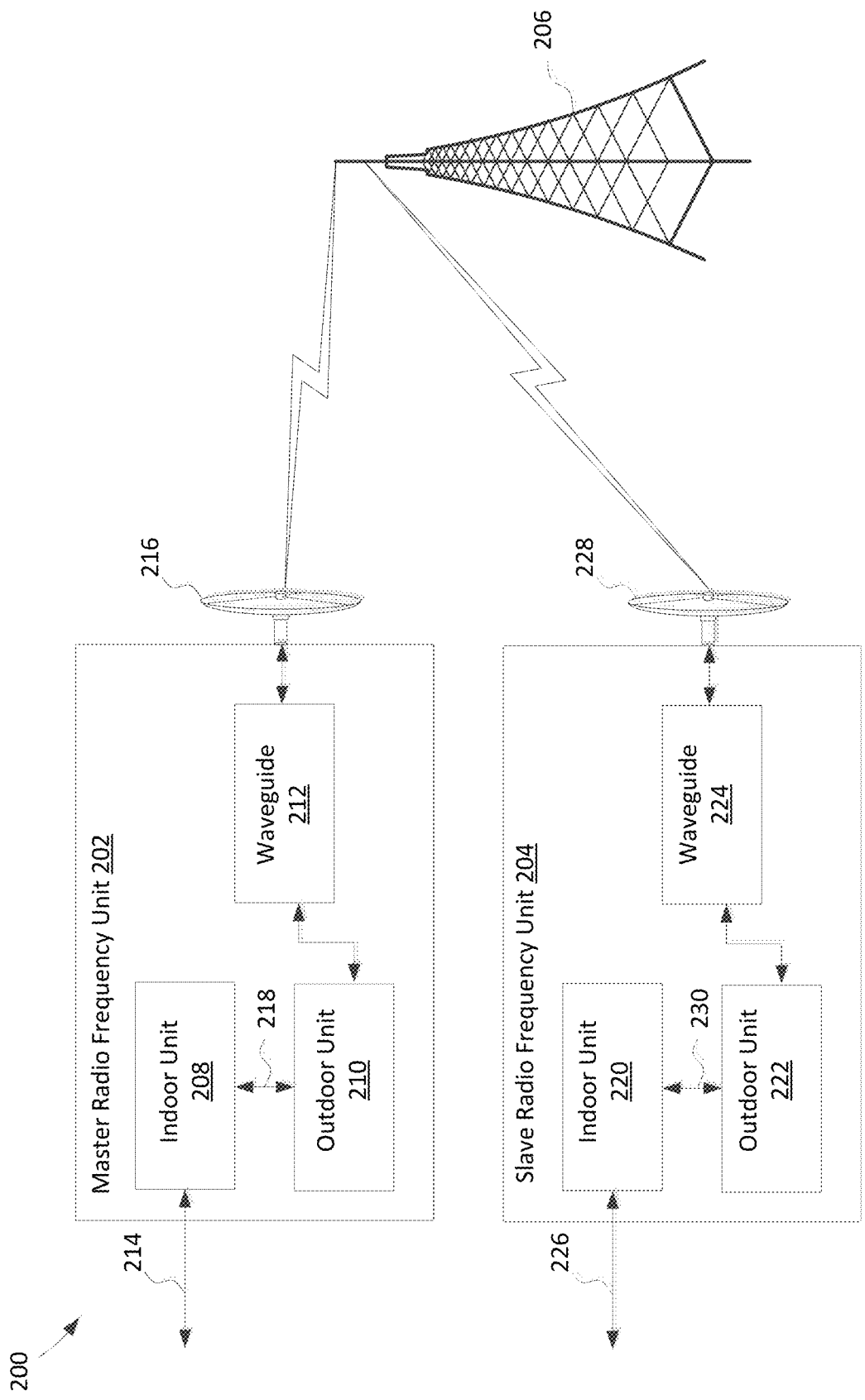
FIG. 2 is an environment including two transceiver units including a master radio frequency unit and a slave radio frequency unit in some embodiments.

FIG. 2 is an environment 200 including two transceiver units including a master radio frequency unit 202 and a slave radio frequency unit 204 in some embodiments. The master radio frequency unit 202 comprises a master clock and the slave radio frequency unit 204 comprises a slave clock. In some embodiments, one or both of the master radio frequency unit 202 and the slave radio frequency unit 204 are IEEE 1588 aware.

The master radio frequency unit 202 and the slave radio frequency unit 204 are split mount radios. A split-mount radio has a part of the electronics mounted outdoors with an antenna and part indoors. The outdoor unit (ODU) may be the RF transmitter/receiver. The indoor unit (IDU) contains the modulator/demodulator, multiplexer, control, and traffic interface elements. The IDU and ODU may be coupled using a cable. By comparison, an all-indoor radio has all radio equipment installed inside and is connected to its antenna using a waveguide or coax feeder. A split-mount radio may be a point-to-point radio installation for licensed 6 to 38+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, master radio frequency unit 202 may comprise an indoor unit (IDU) 208 in communication with a processor and/or a digital device, an outdoor unit (ODU) 210 in communication with the IDU 208 over cables 218, a waveguide 212 in communication with the ODU 210, and an antenna 216. The IDU 208 may comprise a modulator/demodulator and control circuitry for providing data from a digital device or a processor over line 214 to the antenna 216 via the ODU 210 and/or the waveguide 212. Similarly, the IDU 208 may also be configured to receive information from the antenna 216 via the ODU 210 for providing to the digital device or processor via the line 214. The ODU 210 may comprise an RF transmitter/receiver and be coupled with the antenna 216. The waveguide 212 may or may not be a part of the ODU 210.

The IDU 208 of the transceiver unit 202 may be coupled to the ODU 210 utilizing a coaxial cable 218. Although only one coaxial cable 218 is depicted in FIG. 2, any number of coaxial cables may provide signals between the IDU 208 and the ODU 210. Further, those skilled in the art will appreciate that any number and/or type of cables may be configured to receive and transmit signals between the IDU 208 and the ODU 210.

Similarly, slave radio frequency unit 204 may comprise an IDU 220 in communication with a processor and/or a digital device, an ODU 222 in communication with the IDU 220 over cable 230, a waveguide 224 in communication with the ODU 222, and an antenna 228. The IDU 220 may comprise a modulator/demodulator and control circuitry for providing data from a digital device or a processor over line 226 to the antenna 228 via the ODU 222 and/or the waveguide 224. Similarly, the IDU 220 may also be configured to receive information from the antenna 228 via the ODU 222 for providing to the digital device or processor via the line 226. The ODU 222 may comprise an RF transmitter/receiver and be coupled with the antenna 228. The waveguide 224 may or may not be a part of the ODU 222.

The IDU 220 of the transceiver unit 204 may be coupled to the ODU 222 utilizing a coaxial cable 230. Although only one coaxial cable 230 is depicted in FIG. 2, any number of coaxial cables may provide signals between the IDU 208 and the ODU 210. Further, those skilled in the art will appreciate that any number and/or type of cables may be configured to receive and transmit signals between the IDU 208 and the ODU 210.

Those skilled in the art will appreciate that the transceiver unit 204 may perform in a manner similar to the transceiver 202. In various embodiments, the two transceiver units 202 and 204 may be in communication with each other over a wireless communication tower 206. Those skilled in the art will appreciate that the transceiver units 202 and 204, individually or together, may communicate with any digital device or receiver.

The wireless communication tower 206 (e.g., cell tower or other microwave radio device) may be any device configured to receive and/or transmit wireless information.

Although the master radio frequency unit 202 and the slave radio frequency unit 204 are depicted in FIG. 2 as split mount devices, one or both units may not be split mount devices. Further, although only a single wireless communication tower 206 is depicted in FIG. 2, the two units 202 and 204 may communicate over any number of network elements including any number of wireless communication towers, routers, servers, bridges, hubs, other digital devices, or the like.

Figure 3:
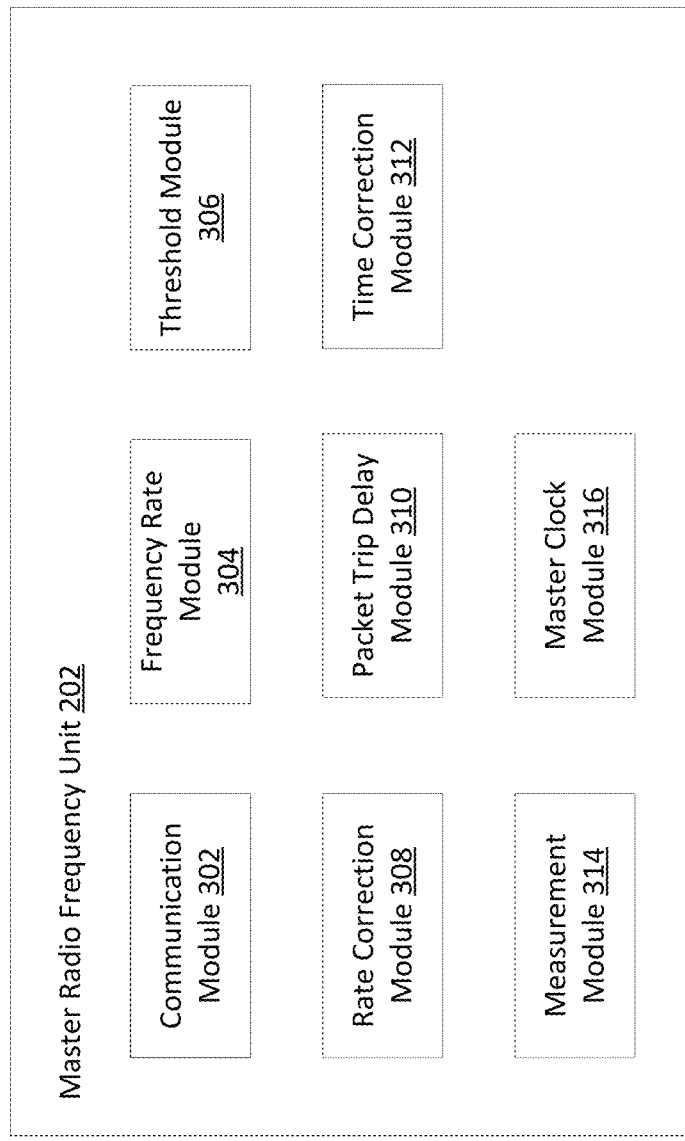
FIG. 3 is a block diagram of a master radio frequency unit in some embodiments.

FIG. 3 is a block diagram of a master radio frequency unit 202 in some embodiments. The master radio frequency unit 202 comprises a communication module 302, a frequency rate module 304, a threshold module 306, a rate correction module 308, a packet trip delay module 310, a time correction module 312, a measurement module 314, and a master clock module 316. A module may be hardware, software, or a combination of both hardware and software.

The communication module 302 provides communication between the master radio frequency unit 202 and the slave radio frequency unit 204 (e.g., over a communication network). In one example, the communication module 302 may provide Sync packets to and receive delay request packets from the slave radio frequency unit 204. In some embodiments, the measurement module 314 described herein logs, tracks, or otherwise determines time when packets are initiated for sending by the communication module 302 and/or when packets are received by the communication module 302.

The frequency rate module 304 determines a frequency rate based on time measurements of packets obtained by the master radio frequency unit 202. The frequency rate may be based on time(s) that one or more packets are received by the communication module 302 and/or time(s) that one or more packets sent by the communication module 302. Further, the frequency rate module 304 may determine a frequency rate based on measurements obtained from the slave radio frequency unit 204. For example, the slave radio frequency unit 204 may determine a time that a packet from the master radio frequency unit 202 is received and provide the determined time within a subsequent packet (e.g., a delay request packet) sent back to the master radio frequency unit 202. The communication module 302 may obtain the time from the subsequent packet. The slave radio frequency unit 204 may also determine the frequency rate based on the time that the subsequent packet is sent.

For example, the frequency rate module 304 may determine a rate (e.g., a forward rate) by determining the difference (e.g., a first skew) between times of receiving a first and receiving a second packet from the master radio frequency unit 202 by the slave radio frequency unit 204, determining a difference (e.g., a second skew) between times of transmitting the first and second packet by the master radio frequency unit 202, and comparing the two differences (e.g., creating a ratio based on the first and second skew). This process is further described herein.

In another example, the frequency rate module 304 may determine a rate (e.g., a reverse rate) by determining the difference (e.g., a first skew) between times of transmitting a first and transmitting a second packet from the slave radio frequency unit 204, determining a difference (e.g., a second skew) between times of receiving the first and second packet by the master radio frequency unit 202, and comparing the two differences (e.g., creating a ratio based on the first and second skew).

The frequency rate module 304 may generate any number of frequency rates based on any number of packets sent to and/or received from a digital device.

The threshold module 306 may calculate, receive, store, and/or be configured to store rate thresholds and packet trip delay thresholds. A rate threshold is a threshold that may be based on a minimum rate determined by the frequency ate module 304 based on a measurements associated with a plurality of packets. For example, the frequency rate module 304 may determine a large number of rates associated with packets between the master radio frequency unit 202 and the slave radio frequency unit 204. The threshold module 306 may determine a minimum of the number of rates. Further, the threshold module 306 may generate a threshold representing an acceptable range relative to the minimum. For example, the threshold module 306 may determine a distribution (e.g., a Gaussian distribution) based on the number of ranges and set a threshold at a predetermined percentage relative to the minimum rate (e.g., bottom 5% of the Gaussian distribution). Those skilled in the art will appreciate that the threshold module 306 may determine (e.g., statistically) the threshold in any number of ways. In some embodiments, the rate threshold may be configured by another digital device and/or the rate threshold may be programmed at installation.

In another example, the packet trip delay module 310 may determine a large number of packet trip delays associated with packets between the master radio frequency unit 202 and the slave radio frequency unit 204. The threshold module 306 or the packet trip delay module 310 may determine a minimum of the number of packet trip delays. The threshold module 306 may generate a threshold (e.g., a delta mean packet delay) representing an acceptable range relative to the minimum. For example, the threshold module 306 may determine a distribution (e.g., a Gaussian distribution) based on the number of packet trip delays and set a threshold at a predetermined percentage relative to the minimum rate (e.g., bottom 5% of the Gaussian distribution). Those skilled in the art will appreciate that the threshold module 306 may determine (e.g., statistically) the threshold in any number of ways. In some embodiments, the packet trip delay threshold may be configured by another digital device and/or the rate threshold may be programmed at installation.

The rate correction module 308 may determine a rate correction to be provided to the slave radio frequency unit 204. In some embodiments, the rate correction module 308 compares a forward rate to a reverse rate from the frequency rate module 304. The forward rate and the reverse rate may be associated with similar or same packets between the master radio frequency unit 202 and the slave radio frequency unit 204. If the forward rate approximates the reverse rate, the rate correction module 308 may generate a rate correction. The communication module 302 may provide the rate correction to the slave radio frequency unit. In some embodiments, a forward rate approximates a reverse rate if the differences between the two rates is within (e.g., below) the rate threshold generated or obtained by the threshold module 306. The slave radio frequency unit 204 may apply the rate correction to a slave clock frequency.

The packet trip delay module 310 may determine a packet trip delay for one or more packets between the master radio frequency unit 202 and the slave radio frequency unit 204. For example, the packet trip delay module 310 may determine a packet trip delay by determining the duration between the master radio frequency unit 202 sending a packet and receiving a response, determining the duration between the slave radio frequency unit 204 receiving the packet from the master radio frequency unit 202 and providing the response (adjusted for rate correction), determining the difference between the two durations, and dividing the difference by two.

In some embodiments, the packet trip delay module 310 determines a large number of packet trip delays based on any number of packets and determines a minimum of the large number of packet trip delays. In some embodiments, the packet trip delay module 310 averages or performs other statistical assessments on the large number of packet trip delays, one or more of the large number of packet trip delays, those packet trip delays that are approximate to the minimum packet trip delay, and/or the minimum packet trip delay.

The time correction module 312 may determine a time offset to be provided to the slave radio frequency unit 204. In some embodiments, the time correction module 312 may generate an offset by determining the difference between a time a packet is received by the slave radio frequency unit 204 from the master radio frequency unit 202, a time the packet is provided from the master radio frequency unit 202 to the slave radio frequency unit 204, and the minimum packet trip delay. In some embodiments, the time correction module 312 generates an offset by determining the difference between a time a packet is transmitted by the slave radio frequency unit 204 to the master radio frequency unit 202 and a time the packet is received by the master radio frequency unit 202 from the slave radio frequency unit 204 as well as adjusting the difference by the minimum packet trip delay (e.g., adding the minimum packet trip delay). Those skilled in the art will appreciate that the time correction module 312 may utilize a mean packet trip delay rather than the minimum packet trip delay in some embodiments.

In various embodiments, the time correction module 312 may provide the offset to the slave radio frequency unit 204 via the communication module 302. The slave radio frequency unit 204 may apply the offset to the slave clock (e.g., the slave clock servo).

The measurement module 314 may measure the time that packets are received and sent by the communication module 302 based on a clock signal from the master clock servo module 316 (e.g., a master reference clock). In some embodiments, the measurement module 314 may retrieve measurements from packets received from the slave radio frequency unit 204. For example, the measurement module 314 may obtain a time measurement from a delay request or response packet provided by the slave radio frequency unit 204. The time measurement may represent the time at which a packet (e.g., a Sync packet) provided by the master radio frequency unit 202 was received by the slave radio frequency unit 204. Further, the measurement module 314 may obtain a time measurement of the time the slave radio frequency unit 204 provided the packet (e.g., delay request or response packet) from the slave radio frequency unit 204 (e.g., by examining the received packet for a timestamp).

Those skilled in the art will appreciate that the measurement module 314 may measure time and/or obtain time measurements in any number of ways.

The master clock module 316 may comprise any type of clock including a reference clock or a clock servo. In some embodiments, the master clock module 316 provides clock signals from any type of clock to the master radio frequency unit 202.

It should be noted that FIG. 3 is exemplary. Alternative embodiments may comprise more, less, or functionally equivalent modules and still be within the scope of present embodiments. For example, the functions of the various modules of the master radio frequency unit 102 may be combined into one or two modules. Similarly, the functions of the various modules of the master radio frequency unit 102 may be performed by any number of modules.

Figure 4:
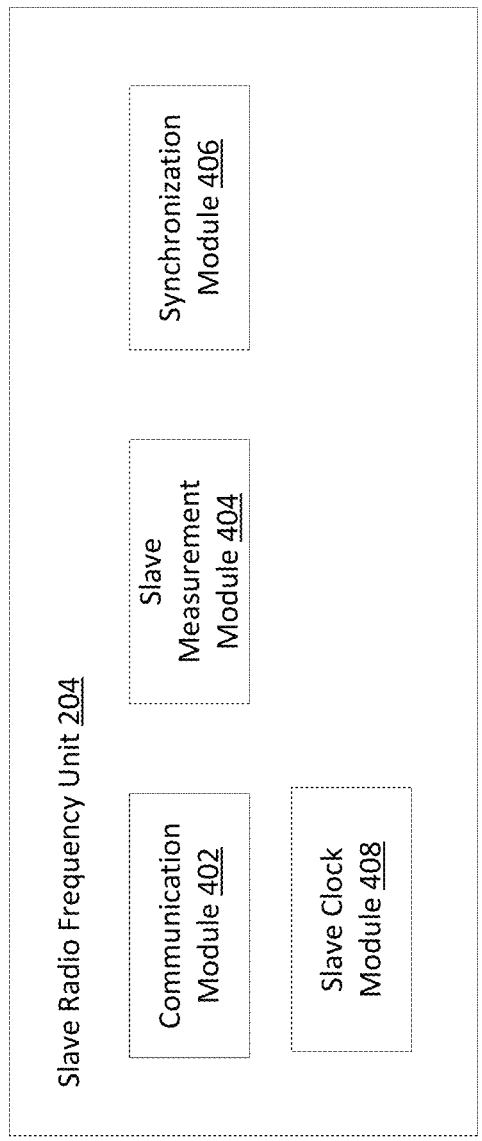
FIG. 4 is a block diagram of a slave radio frequency unit in some embodiments.

FIG. 4 is a block diagram of a slave radio frequency unit 204 in some embodiments. The slave radio frequency unit 204 comprises a communication module 402, a slave measurement module 404, a synchronization module 406, and a slave clock module 408.

The communication module 402 provides communication between the master radio frequency unit 202 and the slave radio frequency unit 204 (e.g., over a communication network). In one example, the communication module 402 may provide delay request packets to and receive Sync packets from the master radio frequency unit 202. In some embodiments, the slave measurement module 404 described herein logs, tracks, or otherwise determines time when packets are initiated for sending by the communication module 402 and/or when packets are received by the communication module 402.

The slave measurement module 404 may measure the time that packets are received and sent by the communication module 402 based on a clock signal from the slave clock servo module 408 (e.g., a slave clock). In some embodiments, the slave measurement module 404 may retrieve measurements from packets received from the master radio frequency unit 202. For example, the slave measurement module 404 may obtain a time measurement from a Sync packet or any packet provided by the master radio frequency unit 202. The time measurement may represent the time at which a packet (e.g., a delay request packet) provided by the slave radio frequency unit 204 was received by the master radio frequency unit 202. Further, the slave measurement module 404 may obtain a time measurement of the time the master radio frequency unit 202 provided the packet (e.g., Sync packet) to the slave radio frequency unit 204 (e.g., by examining the received packet for a timestamp). Those skilled in the art will appreciate that the slave measurement module 404 may measure time and/or obtain time measurements in any number of ways.

The synchronization module 406 may correct the slave clock frequency and/or apply an offset to a clock associated with the slave clock module 408. In some embodiments, the communication module 402 may receive a rate correction from the master radio frequency unit 202. The synchronization module 406 may apply the rate correction to the slave clock frequency. Further, the communication module 402 may receive an offset from the master radio frequency unit 202. The synchronization module 406 may apply the offset to better synchronize the clock associated with the slave clock module 408.

The slave clock module 408 may comprise any type of clock including a slave clock or a clock servo. In some embodiments, the slave clock module 408 provides clock signals from any type of clock to the slave radio frequency unit 204.

It should be noted that FIG. 4 is exemplary. Alternative embodiments may comprise more, less, or functionally equivalent modules and still be within the scope of present embodiments. For example, the functions of the various modules of the slave radio frequency unit 204 may be combined into one or two modules. Similarly, the functions of the various modules of the slave radio frequency unit 204 may be performed by any number of modules.

Figure 5:
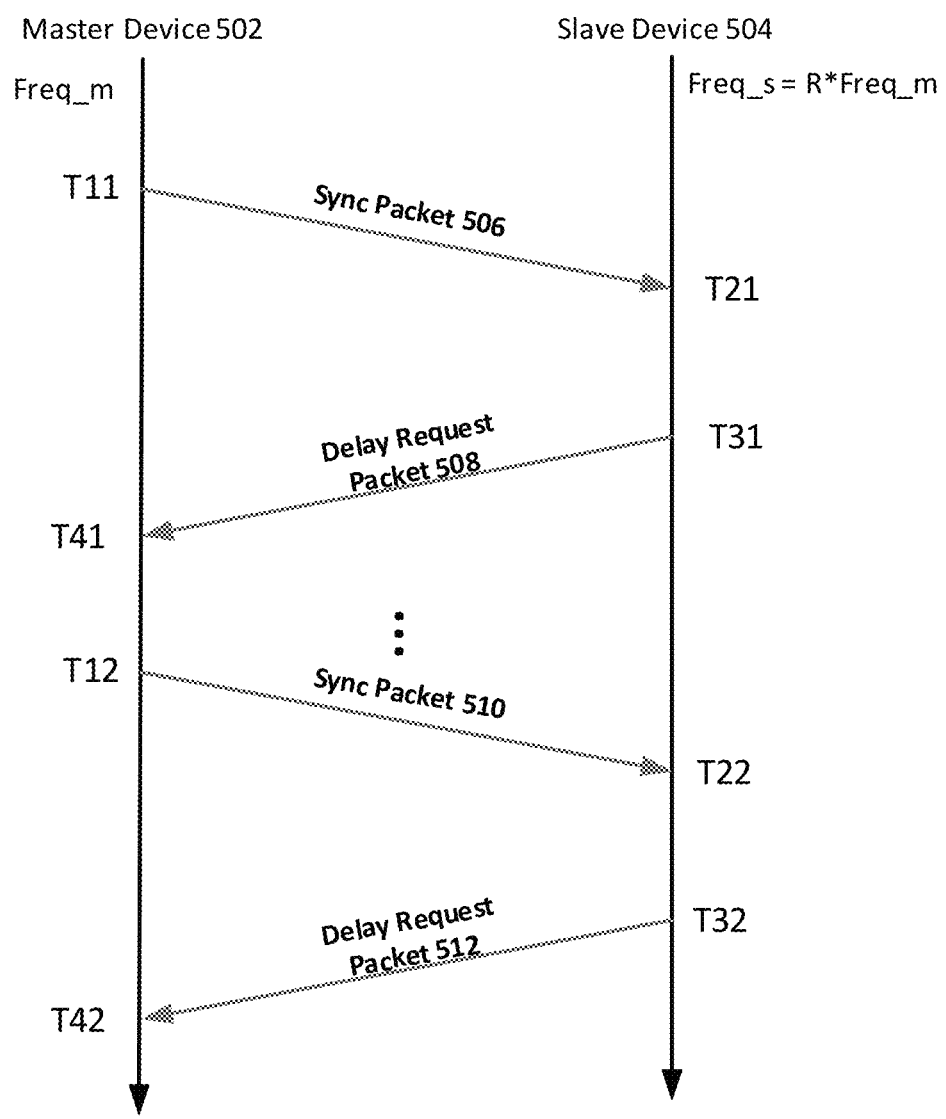
FIG. 5 is a graph depicting packets transmitted between a master device and a slave device in some embodiments

FIG. 5 is a graph 500 depicting packets transmitted between a master device 502 and a slave device 504 in some embodiments. The different times that packets are transmitted and/or received by the master device 502 and the slave device 504 may be used to determine an acceptable slave clock frequency correction and to determine an acceptable offset for the slave clock servo of the slave device. Although FIG. 5 depicts four packets between the master device 502 and the slave device 504, those skilled in the art will appreciate that there may be any number of packets between the master device 502 and the slave device 504.

$T_{11}$ is the time at which the master device 502 initiates sending a first synchronization packet (e.g., sync packet 506) to the slave device 504. $T_{21}$ is the time at which the first synchronization packet is received by the slave device 502.

$T_{31}$ is the time at which the slave device 504 initiates sending a first delay request packet (e.g., delay request 508) to the master device 502. The first delay request packet may comprise an indicator or value representing or including $T_{21}$ and/or an indicator or value representing or including $T_{31}$. $T4_1$ is the time at which the first delay request packet is received by the master device 502.

$T_{12}$ is the time at which the master device 502 initiates sending a second synchronization packet (e.g., sync packet 510) to the slave device 504. $T_{22}$ is the time at which the second synchronization packet is received by the slave device 504.

$T_{32}$ is the time at which the slave device 504 initiates sending a second delay request packet (e.g., delay request 512) to the master device 502. The second delay request packet may comprise an indicator or value representing or including $T_{22}$ and/or an indicator or value representing or including $T_{32}$. $T_{42}$ is the time at which the second delay request packet is received by the master device 502.

Figure 6:
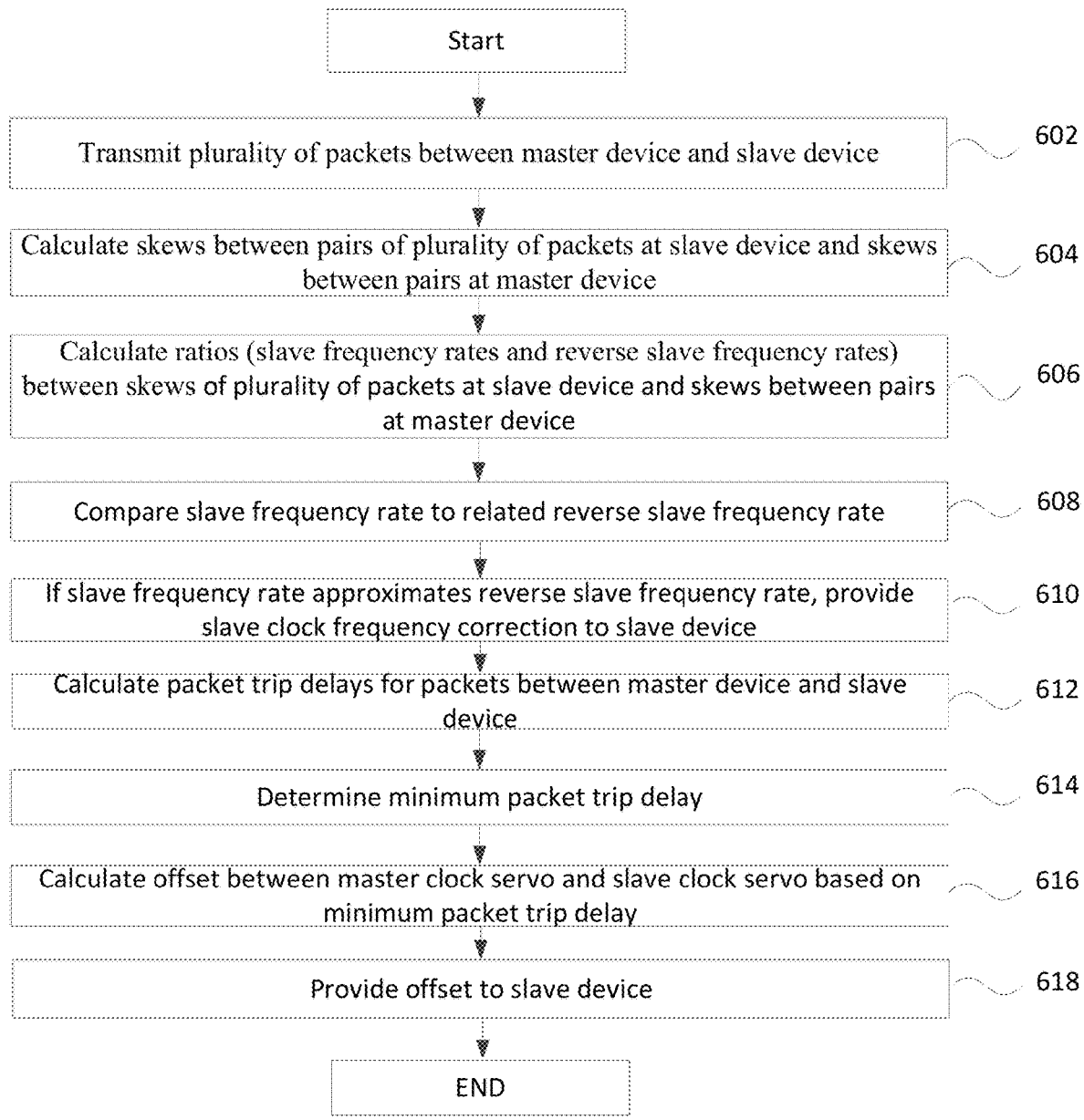
FIG. 6 is a flow chart of an exemplary method for calculating an offset for the slave clock servo in some embodiments.

FIG. 6 is a flow chart of an exemplary method for calculating an offset for the slave clock servo in some embodiments. In step 602, the communication module 302 of the master radio frequency unit 202 (e.g., a master device such as master device 502) and the communication module 402 of the slave radio frequency unit 204 (e.g., a slave device such as slave device 504) transmit and receive a plurality of packets. The plurality of packets may include synchronization packets (e.g., Sync packets 506 and 510), delay request packets (e.g., delay request packets 508 and 512), or any other kind of packets.

Those skilled in the art will appreciate that although only two devices are depicted in FIG. 5, there may be any number of switches, routers, bridges, servers, or other devices that may receive and/or relay packets between the master device 502 and the slave device 504. In some embodiments, different packets may take different paths through the network to reach the destination. For example, a path of a first packet between the master device 502 and the slave device 504 may take a path through a network and include additional network elements to relay the first packet when compared to a path of a second packet. Similarly, there may be any number of packets that take any number of paths between the master radio frequency unit 202 and the slave radio frequency unit 204.

In step 604, the measurement module 314 of the master radio frequency unit 202 calculates skews between pairs of a plurality of packets at the master device. Similarly, the measurement module 404 of the slave radio frequency unit 204 calculates skews between pairs of the plurality of packets at the slave device. For example, the measurement module 314 may measure, track, and/or store the time the master device initiates sending packets (e.g., time T11 and T12 of FIG. 5) and the time the master device receives packets (e.g., time T41 and T42). The measurement module 404 of the slave radio frequency unit 204 may measure, track, and/or store the time the slave device receives packets (e.g., time T21 and T22) and initiates sending packets (e.g., time T31 and T32 of FIG. 5). In various embodiments, the communication module 402 of the slave device provides the time measurements to the master device (e.g., in delay request packets or any packets).

In step 606, the frequency rate module 304 of the master radio frequency unit 202 calculates ratios (e.g., slave frequency rates and reverse slave frequency rates) based on skews between pairs of the plurality of packets at the slave radio frequency unit 204 and the skews between pairs of the plurality of packets at the master radio frequency unit 202.

In various embodiments, the slave frequency rate R is calculated as follows:

$$Rms = \frac{[(T)_{22} - T_{21}]}{[(T)_{12} - T_{11}]}$$

T21, T22, T11, and T12 are times as referenced regarding FIG. 5. T21 is the time a packet (e.g., the sync packet 506) is received by the slave radio frequency unit 204. T22 is the time a different packet (e.g., the sync packet 510) is received by the slave radio frequency unit 204. T12 is the time that the master radio frequency unit 202 initiates sending a packet (e.g., the sync packet 510) to the slave radio frequency unit 204. T22 is the time that the master radio frequency unit 202 initiates sending a different packet (e.g., the sync packet 506) to the slave radio frequency unit 204.

And in reverse path R is calculated in a similar way:

$$Rms = \frac{[(T)_{32} - T_{31}]}{[(T)_{42} - T_{41}]}$$

T31, T32, T41, and T42 are also times as referenced regarding FIG. 5. T31 is the time the slave radio frequency unit 204 initiates sending a packet (e.g., the delay request packet 508) to the master radio frequency unit 202. T32 is the slave radio frequency unit 204 initiates sending a different packet (e.g., the delay request packet 512) to the master radio frequency unit 202. T41 is the time that the master radio frequency unit 202 receives a packet (e.g., delay request packet 508) from the slave radio frequency unit 204. T42 is the time that the master radio frequency unit 202 receives a different packet (e.g., delay request packet 512) from the slave radio frequency unit 204.

Those skilled in the art will appreciate that the measured times utilized to determine R or the reverse path may be measured based on packets that are sent and received serially or based on packets that are not serial (e.g., other packets may be sent between the master radio frequency unit 202 and the slave radio frequency unit 204). For example, other packets may be sent from the master radio frequency unit 202 to the slave radio frequency unit 204 between the Sync packet 506 and the Sync packet 510.

In some embodiments, for the slave frequency rate, Rms, and the reverse slave frequency rate, Rsm, any combination of subsequent sync or delay_req messages like Sync_n vs. Sync_n−1 or Sync_n vs. Sync_1 may be used. Those skilled in the art will appreciate that quick frequency skew and/or slow frequency skew may be tracked.

In step 608, the frequency rate module 304 compares the slave frequency rate, Rms to the reverse slave frequency rate, Rsm. If the slave frequency rate approximates the reverse slave frequency rate, then the slave frequency rate (e.g., a slave clock frequency correction, Rms, or Rsm) may be provided to the slave radio frequency unit 204 to correct the rate of the slave radio frequency unit 204 in step 610.

In various embodiments, the difference between the slave frequency rate and the reverse slave frequency rate is determined and compared to a predetermined threshold (i.e., from the threshold module 306). If the difference is below the threshold or related to the threshold, the slave frequency rate may be provided to the slave radio frequency unit 204. The threshold may be set at installation or fabrication of the master radio frequency unit 202 or the slave radio frequency unit 204. In some embodiments, the threshold may be determined and the master radio frequency unit 202 configured to utilize the threshold. For example, a person or mechanism experienced with a network or elements of a network may configure the threshold. In some embodiments, the master radio frequency unit 202 may track the calculation of multiple slave frequency rates and/or reverse slave frequency rates over many packets. The master radio frequency unit 202 may set a percentage (e.g., 5%) of the smallest differences between many slave frequency rates and reverse frequency rates to determine the threshold. Those skilled in the art will appreciate that there are many ways to determine, calculate, and/or statistically generate the threshold. The threshold may be stored within and/or retrieved by the threshold module 306.

Those skilled in the art will appreciate that packet delay variation (PDV) can change from packet to packet so only when Rms and Rsm are sufficiently close (e.g., the slave frequency rate approximates the reverse slave frequency rate), then, statistically, the experienced PDV from subsequent sync or delay_req message may be acceptably small. As such, the Rms and/or Rsm may be used for further processing. In various embodiments, any and/or all Rms and Rsm may be utilized for further processing.

In various embodiments, multiple slave frequency rates and/or reverse slave frequency rates are determined and multiple slave rate corrections (e.g., a slave clock frequency correction such as the slave frequency rate) are provided (e.g., periodically) to the slave frequency ratio unit 204.

In some embodiments, after few rate corrections, the packet trip delay module 310 may calculate the packet trip delay based on packets between the master radio frequency unit 202 and the slave radio frequency unit 204 in step 612. The packet trip delay (e.g., round-trip delay), RTD, is as follows:

$$RTD = \frac{(T_4 - T_1) - (T_3 - T_2) \times R}{2}$$

wherein T4 is the time a response from the slave radio frequency unit 204 is received by the master frequency ratio unit 202. T1 is the time the master radio frequency unit 202 initiates sending a packet to the slave radio frequency unit 204. T3 is the time the slave radio frequency unit 204 initiates sending the response to the master radio frequency unit 202. T2 is the time the slave radio frequency unit 204 receives the packet from the master radio frequency unit 202. R may be a slave frequency rate (e.g., a slave frequency rate correction, slave frequency rate, or reverse slave frequency rate).

Those skilled in the art will appreciate that the packet transmitted from the master radio frequency unit 202 to the slave radio frequency unit 204 and/or the response transmitted from the slave radio frequency unit 204 to the master radio frequency unit 202 may include packets previously sent (e.g., packets whose times have been previously used to determine a slave frequency rate or reserve slave frequency rate) or may be any other packets.

In step 614, the packet trip delay module 310 may calculate multiple packet trip delays and may determine a minimum packet trip delay. Where N is the number of packet trip delays calculated, a mean packet trip delay may be determined as follows:

$$\text{mean}RTD = \min(RTD[1 \ldots N])$$

After N measurements, in step 616, the time correction module may utilize the mean packet trip delay to calculate an offset between the master clock servo of the master radio frequency unit 202 and the slave clock servo of the slave radio frequency unit 204. In one example, the first mean packet trip delay value which is used for slave offset calculation may be defined by IEEE 1588 std as follows:

$$\text{offset} = T_2 - T_1 - \text{mean}RTD$$

Or in reverse path $$\text{offset} = T_3 - T_4 + \text{mean}RTD$$

For subsequent packet trip delay measurements, after N-th measurement, the packet trip delay module 310 and/or the time correction module 312 may define a deltaMPD parameter which is the "allowed" meanRTD variation around current min meanRTD or threshold for further meanRTD selection.

In various embodiments, after M>>N measurements, the packet trip delay module 310 and/or the time correction module 312 may clear the meanRTD measurement and repeat min meanRTD determination. In one example, re-determining the mean packet trip delay and/or delta MPD parameter allow for the network topology to change and/or network conditions to update (e.g., change of day resulting in a change of activity or significant traffic on the network)

Parameters deltaMPD, N and M may be determined by experience (e.g., through configuration by a professional) or automatically determined by a processor based on data collection and history. In some embodiments, the deltaMPD may depend on traffic conditions and a number of switches in chain. This may also be also for M and N. M may be also replaced with triggered from network while path reconfiguration.

Figure 7:
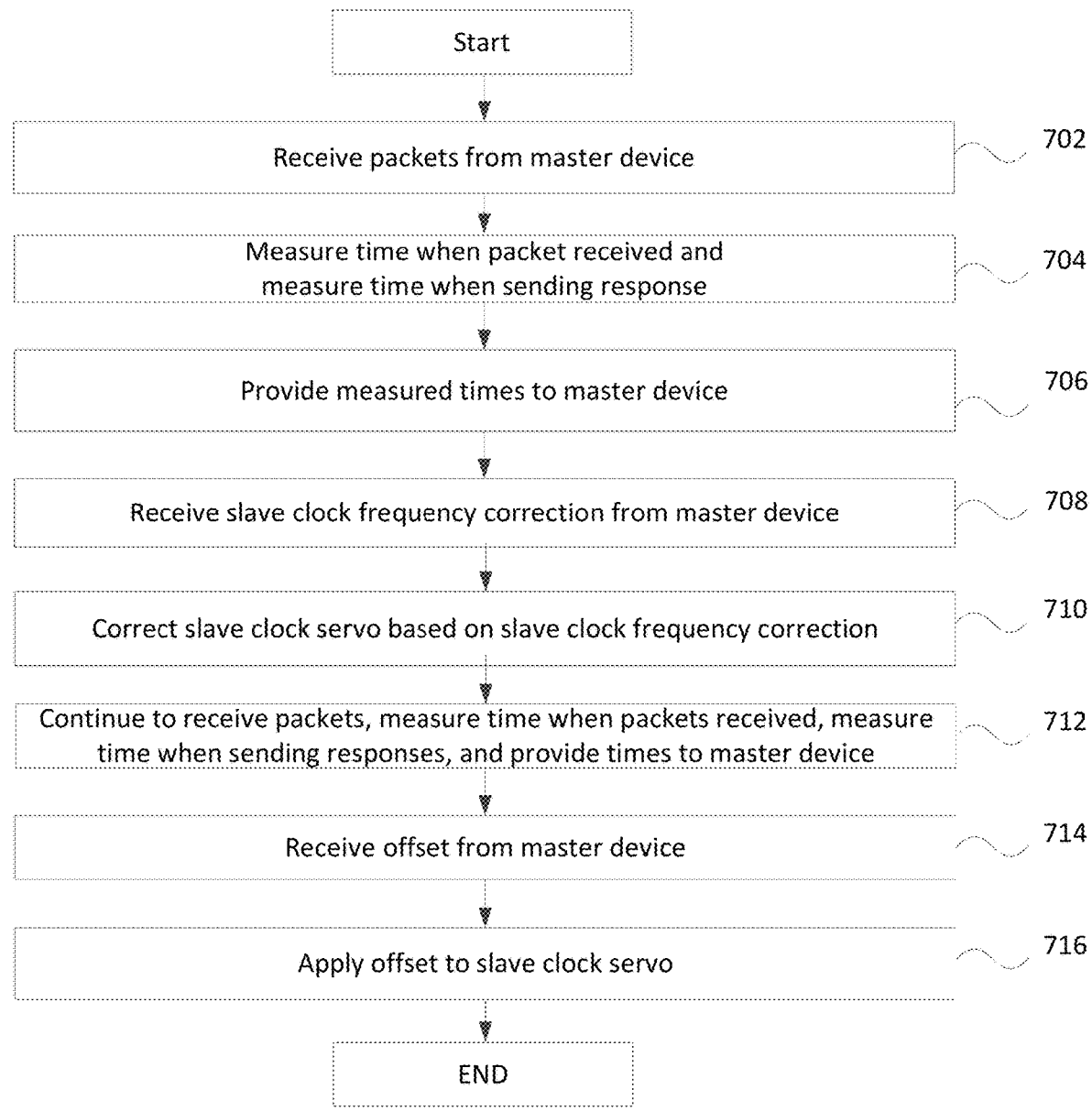
FIG. 7 is a flow chart of an exemplary method for applying an offset for the slave clock servo in some embodiments.

FIG. 7 is a flow chart of an exemplary method for applying an offset for the slave clock servo in some embodiments. In step 702, the communication module 402 of the slave radio frequency unit 204 (e.g., a slave device such as slave device 504) and the communication module 302 of the master radio frequency unit 202 (e.g., a master device such as master device 502) transmit and receive a plurality of packets. The plurality of packets may include synchronization packets (e.g., synchronization packets 506 and 510), delay request packets (e.g., delay request packets 508 and 512), or any other kind of packets.

In step 704, the slave measurement module 404 of the slave radio frequency unit 204 may measure time(s) at which packets are received from the master radio frequency unit 202. The slave measurement module 404 may also measure time(s) at which packets are prepared to send to the master radio frequency unit 202. In step 706, the communication module 302 may provide one or more time measurements from the slave measurement module 304 within a packet (e.g., a delay request packet 508) and provide the packet to the master radio frequency unit 202.

In some embodiments, the slave measurement module 404 may calculate skews between pairs of a plurality of packets. For example, the slave measurement module 404 may measure, track, and/or store the time the slave device initiates sending packets (e.g., time T21 and T32 of FIG. 5) and the time the slave device receives packets (e.g., time T21 and T22). In various embodiments, the communication module 402 of the slave device provides all or some of the time measurements to the master radio frequency unit 202 (e.g., in delay request packets or any packets).

In step 708, the synchronization module 406 receives a slave clock frequency correction from the master radio frequency unit 202. In step 710, the synchronization module 406 may apply the slave clock frequency correction to the slave clock (e.g., at or associated with the slave clock module 408). In some embodiments, the synchronization module 406 confirms the authenticity of the packet from the master radio frequency unit, confirms integrity, and/or validates the slave clock frequency correction.

In step 712, the slave radio frequency unit 204 continues to receive packets (e.g., via the communication module 402), measure time when packets are received, measure time when sending packets (e.g., via the slave measurement module 404), and provides times to the master radio frequency unit 202.

In step 714, the synchronization module 406 receives an offset from the master radio frequency unit 202. In step 716, the synchronization module 406 may apply the offset to the slave clock (e.g., at or associated with the slave clock module 408). In some embodiments, the synchronization module 406 confirms the authenticity of the packet from the master radio frequency unit, confirms integrity, and/or validates the offset.

Figure 8:
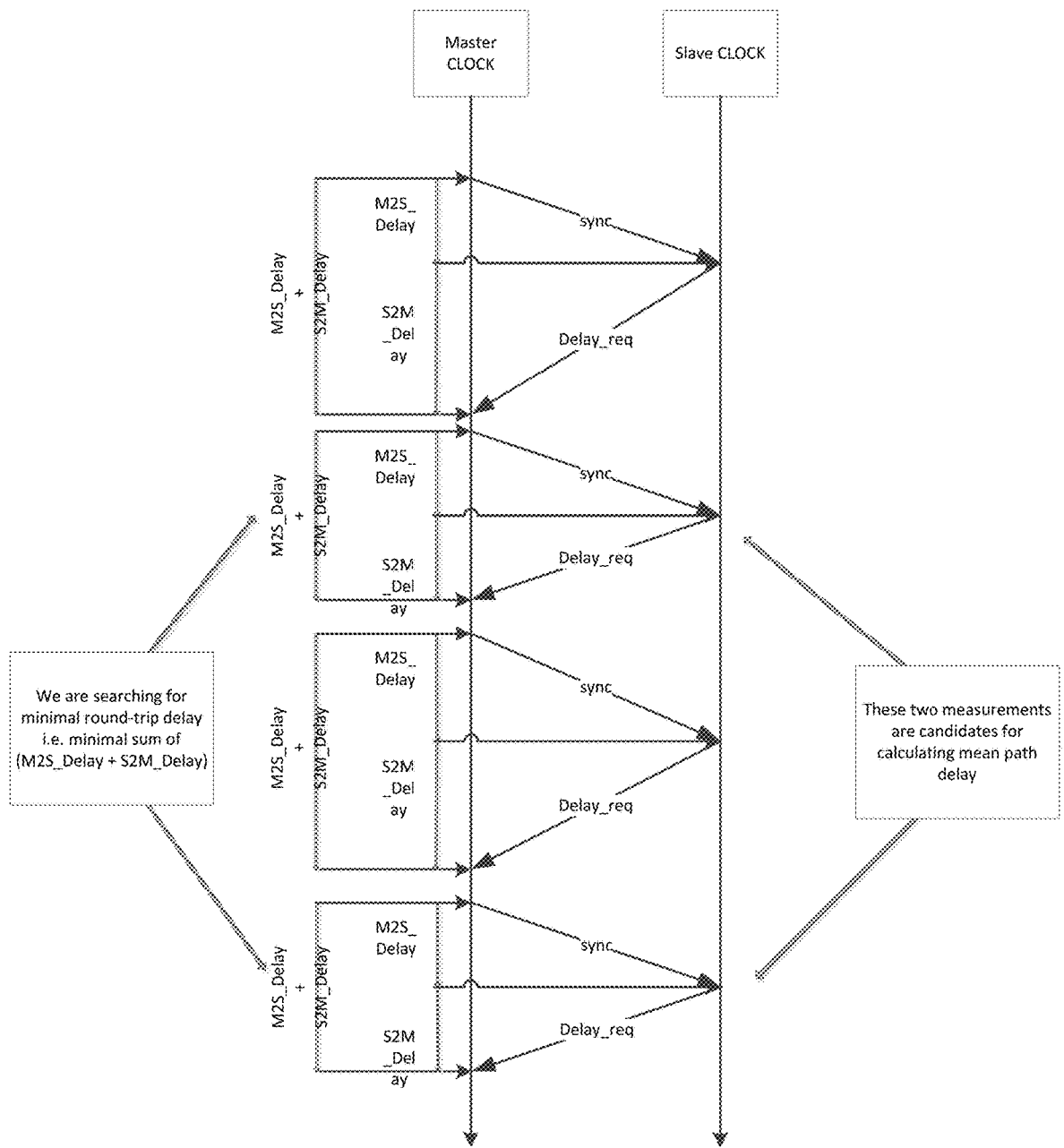
FIG. 8 is a diagram of communication between a master clock and a slave clock in some embodiments.

FIG. 8 is a diagram 800 of communication between a master clock 802 and a slave clock 804 in some embodiments. In some embodiments, both Sync and Delay-Req messages are utilized to make time corrections. A Sync message or Sync packet may be provided from the master digital device with master clock servo 102 to the slave digital device with slave clock servo 104. The Delay-Req message or Delay-Req packet may be provided by the slave digital device with slave clock servo 104 to the master digital device with master clock servo 102.

For Sync messages, if the MSdelay is less than the minMPD, then the measurement may indicate there may be a time offset of at least MSdelay−minMPD. In this case, time correction may be made based on the offset measurement. If the MSdelay is bigger than the minMPD, there may be insufficient information regarding whether the error is due to a time offset or due to packet delay variation (PDV). Similarly for Delay_Req messages, if the SMdelay is less than the minMPD, then the measurement may indicate that there is a time offset of at least minMPD−SMdelay. This may result in a detected positive rather than negative offset as seen with the MSdelay measurement. In some embodiments, time corrections may be implemented by adjusting the PTP clock rate for a period of time.

To prevent large rate fluctuations, each connection may be limited in magnitude. As a result, of limiting the connections, the process may assist in reducing time interval errors caused by rapid corrections of time offsets. Errors may be managed by keeping a TimeError value. If a new error is determined caused by a Sync message received or Delay-Resp message received, indicating a bigger offset, TimeError may adopt the new value, otherwise, TimeError may remain unchanged. Based on TimeError, limited correction may be made and subtracted from TimeError. Thus the measurement of the offset may take multiple corrections before it is completely corrected. The mechanism may be less likely to make invalid corrections.

Figure 9:
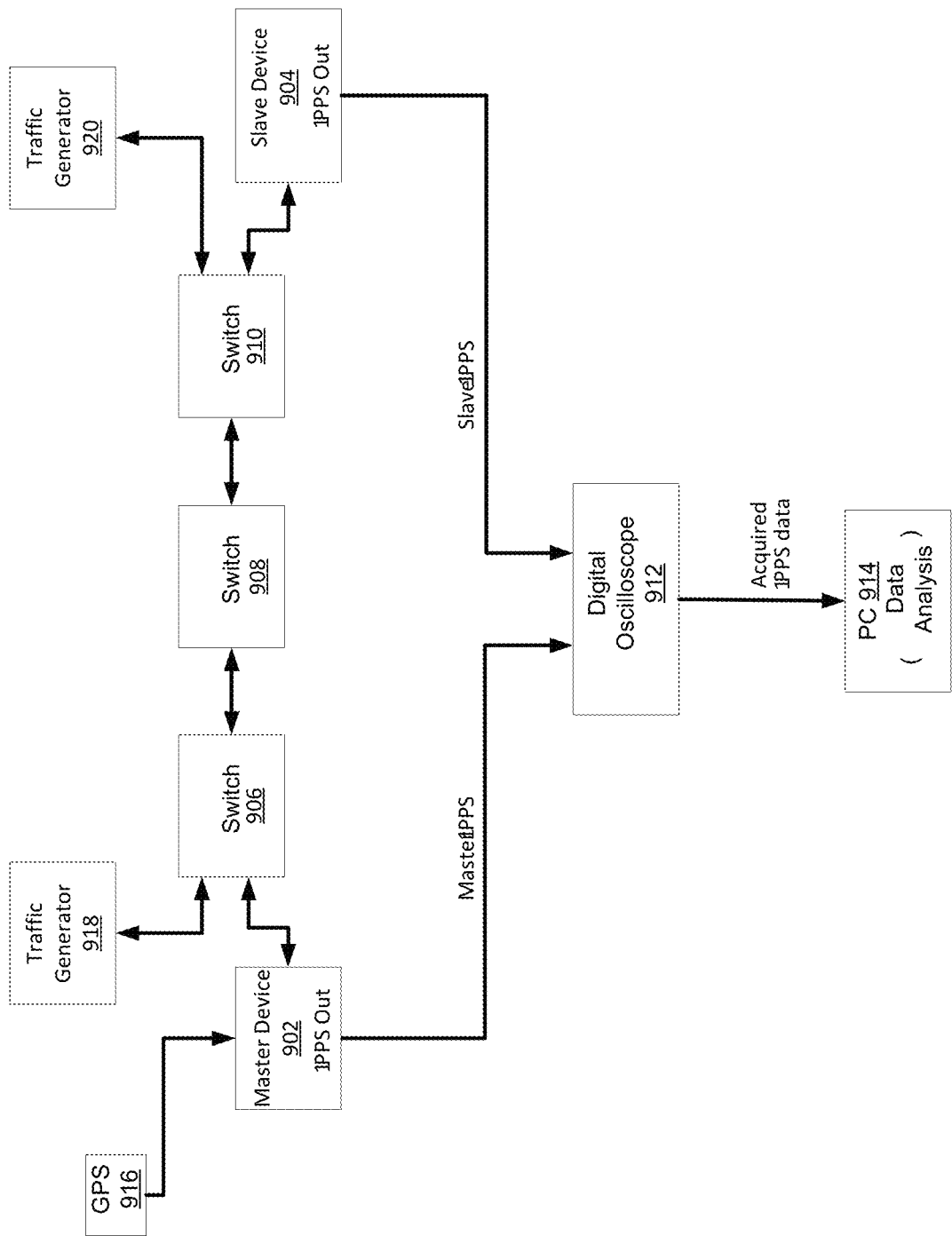
FIG. 9 is an exemplary environment that may be used to simulate some embodiments described herein.

FIG. 9 is an exemplary environment 900 that may be used to simulate some embodiments described herein. The system comprises a master device 902 and the slave device 904. The master device 902 and the slave device 904 may communicate with each other through one or more of the switches 906-910. A digital oscilloscope 912 may be coupled to the master device 902 and the slave device 904. A PC 914 may receive the output from the digital oscilloscope 912. The master device 902 may be coupled with a GPS 916. Traffic generators 918 and 920 may simulate traffic for testing. The environment 900 may be used to generate test data such as that which is depicted in FIGS. 13-27.

In some embodiments, initial conditions for an exemplary test include:
GPS Locked
IEEE 1588 Master Locked to a GPS reference
Between Master and slave only one switch
PC traffic generator shut down The test may be started with no forced traffic (i.e., the traffic generators 918 and 920 being disabled) and with only one Ethernet switch (e.g., switch 906) between the master device 902 and the slave device 904. In one example, the oscilloscope 912 may indicate 1pps signals from master and slave pps output and measure phase difference between slave 1pps signal and master 1pps signal. On the PC 914 coupled with the oscilloscope 912, acquired data may be analyzed to produce slave offset graphs and slave offset distribution graphs. Measurements may be repeated with active second and third Ethernet switches (e.g., switches 908 and 910).

Both master and slave devices 902 and 904 may use Ethernet PHY capable of producing timestamps for IEEE1588 event messages (e.g., DP83640 by National Semiconductor). In some test scenarios, the master and slave devices 902 and 904 run IEEE1588v2 standard protocol packet exchange. The slave device 904 may employ an additional clock servo. The master device 902 may be any digital device. Further, the slave device 904 may be any digital device.

Figure 10:
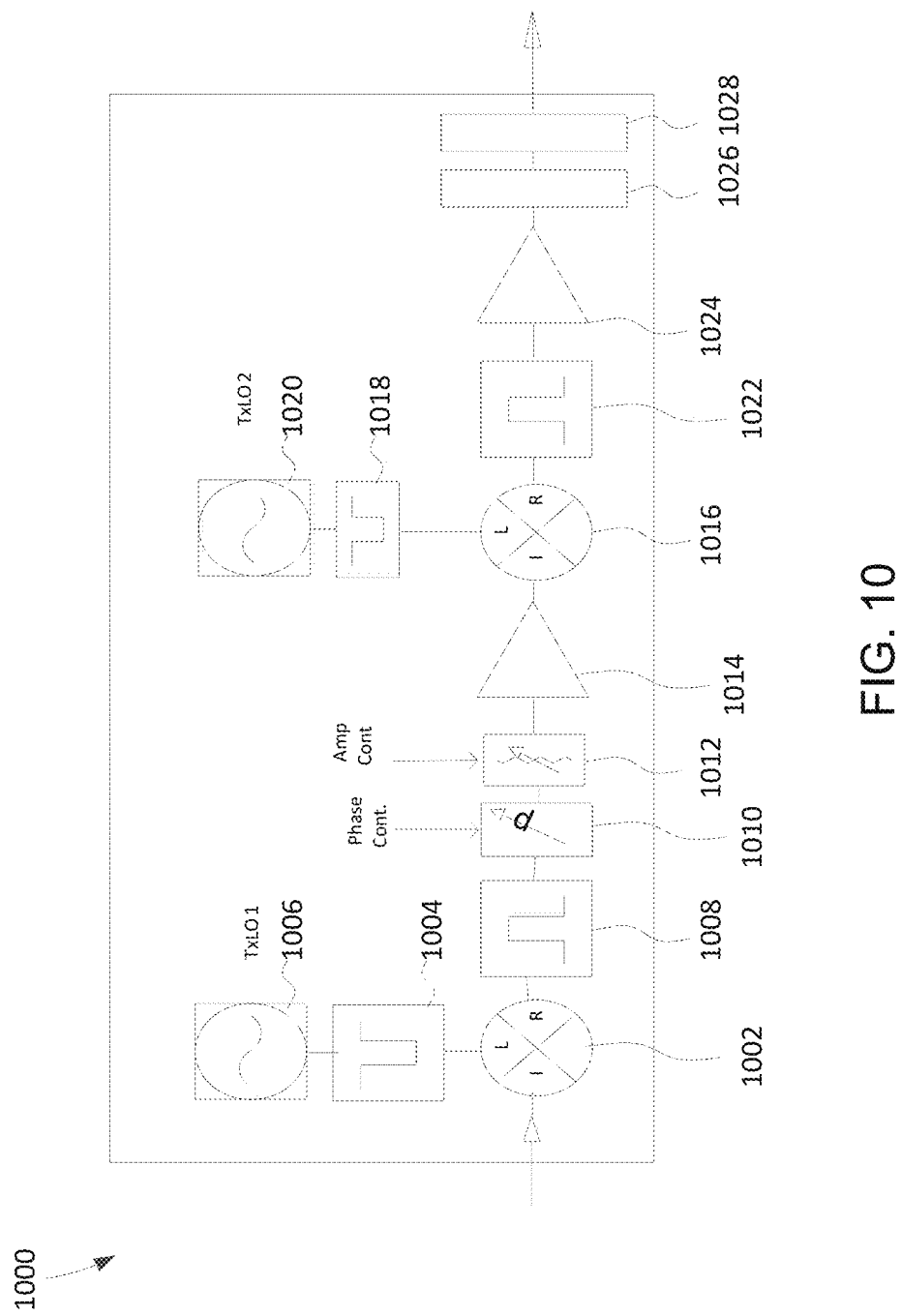
FIG. 10 depicts a master radio frequency unit in some embodiments.

FIG. 10 depicts a master radio frequency unit 202 in some embodiments. The master radio frequency unit 202 may be configured to perform all or some of the steps discussed regarding FIG. 6. For example, the mixer 1002 may receive packets (e.g., Synch packets, packets containing rate corrections, offsets, or any packets) from a digital device to be provided to the slave radio frequency unit 204. The master radio frequency unit 202 may comprise mixer modules 1002 and 1016, filter modules 1004, 1008, 1018, and 1022, oscillator modules 1006 and 1020, a phase adjuster 1010, an automatic gain control (AGC) module 1012, amplification/attenuation modules 1014 and 1024, waveguide filter 1026, and waveguide 1028. The transmitting radio frequency unit 1002 may further comprise a signal quality module that may control the phase adjuster 1010 and/or the AGC module 1012.

In various embodiments, the master radio frequency unit 202 is a part of the ODU 210. The mixer module 1002, filter module 1004, and the oscillator module 1006 may represent an upconverter configured to upconvert the signal received from a gain module to an intermediate frequency signal. Similarly, the mixer module 1016, filter module 1018, and oscillator module 1020 also may represent an upconverter configured to further upconvert the signal to an RF signal. Those skilled in the art will appreciate that there may be any number of upconverters configured to upconvert the signals within the transmitting radio frequency unit 1002.

The mixer modules 1002 and 1016 may comprise mixers configured to mix the signal(s) provided by the modem with one or more other signals. The mixer modules 1002 and 1016 may comprise many different types of mixers with many different electrical properties. In one example, the mixer 1002 mixes the signal received from a gain module (not shown) with the filtered oscillating signal from the filter module 1004 and the oscillator module 1006. In another example, the mixer module 1016 mixes a signal received from the amplifier/attenuator module 1014 with the filtered oscillating signal from the filter module 1018 and the oscillator module 1020.

Those skilled in the art will appreciate that each of the mixers 1002 and 1016 may be the same as one or more other mixer modules. For example, mixer modules 1002 and 1016 may both be mixers sharing the same electrical properties or, alternately, the mixer 1002 and 1016 may be another kind of mixer and/or with different electrical properties. Each mixer modules 1002 and 1016 may include one or more components. For example, the mixer module 1002 may comprise one or more mixers.

The filter modules 1004, 1008, 1018, and 1022 may comprise filters configured to filter the signal. The filter modules 1004, 1008, 1018, and 1022 may comprise many different types of filters (e.g., bandpass filter, low pass filter, high pass filter, or the like) with many different electrical properties. In one example, the filter module 1004 may be a band pass filter configured to filter the oscillation signal (or components of the signal) provided from the oscillator module 1006. Similarly, filter modules 1004, 1008, 1018, and 1022 may filter signals (or components of the signals) from the oscillator module 1006, the oscillator module 1020, the mixer module 1002, or the mixer module 1016, respectively.

Those skilled in the art will appreciate that each of the filter modules 1004, 1008, 1018, and 1022 may be the same as one or more other filter modules. For example, filters modules 1004 and 1008 may both be filters sharing the same electrical properties while filter module 1018 may be another kind of filter. In another example, filters module 1004 and 1008 may both be filters of a similar type but have different electrical properties.

Each filter modules 1004, 1008, 1018, and 1022 may include one or more components. For example, the filter modules 1004 may comprise one or more filters.

The oscillator modules 1006 and 1020 may comprise oscillators configured to provide an oscillating signal that may be used to upconvert the signal. The oscillator modules 1006 and 1020 may comprise any kind of oscillator with any different electrical properties. In one example, the oscillator module 1006 provides an oscillating signal to the filter module 1004. The oscillator module 1020 may provide an oscillating signal to the filter module 1018.

The oscillator modules 1006 and 1020, either individually or together, may be local or remote. In one example, the oscillating module 1006 and/or the oscillating module 1020 may be remotely located and configured to provide an oscillating signal to one or more transmitting radio frequency units. In some embodiments, a single oscillating module may provide an oscillating signal to both the mixer module 1002 and 1016, respectively (e.g., optionally via a filter). In one example, the oscillator signal from the oscillator module may be altered (e.g., oscillation increased or decreased) and provided to a different part of the circuit.

Those skilled in the art will appreciate that each of the oscillator modules 1006 and 1020 may be the same as each other. For example, oscillator modules 1006 and 1020 may both be oscillators sharing the same electrical properties or, alternately, the oscillator modules 1006 and 1020 may be another kind of oscillator and/or with different electrical properties. Each oscillator modules 1006 and 1020 may include one or more components. For example, the oscillator module 1006 may comprise one or more oscillators.

In various embodiments, the master radio frequency unit 202 includes a signal quality module. The signal quality module may be configured to generate a phase control signal to control the phase of a processed signal. In one example, the signal quality module receives the upconverted RF signal from the amplifier/attenuator module 1024 and mixes the amplified or attenuated signal with the filtered oscillator signal or the upconverted signal from the second upconverter. The signal quality module may filter the signal and compare the filtered, mixed signal with a predetermined phase value to generate a phase control signal based on the comparison.

The phase adjuster 1010 may comprise a variable phase control circuit configured to increase or decrease the phase of the signal to be transmitted. The phase adjuster 1010 may comprise any different type of phase adjuster or phase shifter with different electrical properties. In one example, the phase adjuster 1010 increases or decreases the phase of the signal received from the filter module 1008. The phase adjuster 1010 may adjust the phase of the signal based on the phase control signal from the signal quality module.

The phase adjuster 1010 may include one or more components. For example, the phase adjuster 1010 may comprise one or more phase control elements.

The AGC module 1012 may comprise an automatic gain control (AGC) circuit configured to increase or decrease the gain of the signal received from the phase adjuster 1010. The AGC module 1012 may comprise many different types of AGCs with many different electrical properties. In one example, the AGC module 1012 increases or decreases the gain of the signal received from the phase adjuster 1010. The AGC module 1012 may adjust the gain of the signal based on the gain control signal.

The AGC module 1012 may include one or more components. For example, the AGC module 1012 may comprise one or more AGCs.

In various embodiments, in order to adjust the phase of the signal or the amplitude of the signal, the signal quality module may provide control signals to adjust the filtered signal from the filter module 1008 to achieve the desired adjustment. For example, in order to adjust the phase or amplitude of the signal, the signal quality module may compare the phase and amplitude of the signal to be provided to the waveguide filter 1026 and/or the waveguide 1028 based on a predetermined phase value and/or a predetermined amplitude value. Based on the comparison, the signal quality module may generate phase and gain control signals to achieve the desired adjustment.

In some embodiments, the predetermined phase value and amplitude value may be the same or substantially similar as the phase and amplitude of the wireless signals outputted by one or more other transmitting radio frequency units. In one example, the phase and the amplitude of one or more transmitting radio frequency unit may be synchronized.

The amplification/attenuation modules 1014 and 1024 may comprise an amplifier and/or an attenuator configured to amplify and/or attenuate a signal. The amplification/attenuator modules 1014 and 1024 may be any kind of amplifiers and/or attenuators. Further, the amplification/attenuator modules 1014 and 1024 may each comprise amplifiers and/or attenuators with any kind of electrical properties.

In some embodiments, the amplifier/attenuator module 1014 receives a signal from the AGC module 1012. The amplifier/attenuator module 1014 may amplify or attenuate the signal. Further, the amplifier/attenuator module 1024 may attenuate the signal (or components of the signal) after the signal has been upconverted by the mixer module 1016, the filter module 1018, and the oscillator module 1020. The amplifier/attenuator module 1024 may then provide the signal to the signal quality module and/or the waveguide filter 1026.

Those skilled in the art will appreciate that each of the amplifier/attenuator modules 1014 and 1024 may be the same as one or more other amplifier/attenuator modules. For example, amplifier/attenuator modules 1014 and 1024 may both be amplifiers sharing the same electrical properties. In another example, amplifier/attenuator modules 1014 and 1024 may both be amplifiers but have different electrical properties.

The master radio frequency unit 202 may comprise the waveguide filter 1026 and the waveguide 1028. The waveguide filter 1026 may be any filter coupled to the waveguide 1028 and configured to filter the electromagnetic waves (e.g., remove noise). The waveguide 1028 may provide the signal to an antenna via a diplexer. The diplexer may provide the signal to the antenna. The waveguide 1028 may be any waveguide kind or type of waveguide. For example, the waveguide 1028 may be hollow or dielectric. In some embodiments, the waveguide 1028 comprises a rectangular to circular waveguide.

Figure 11:
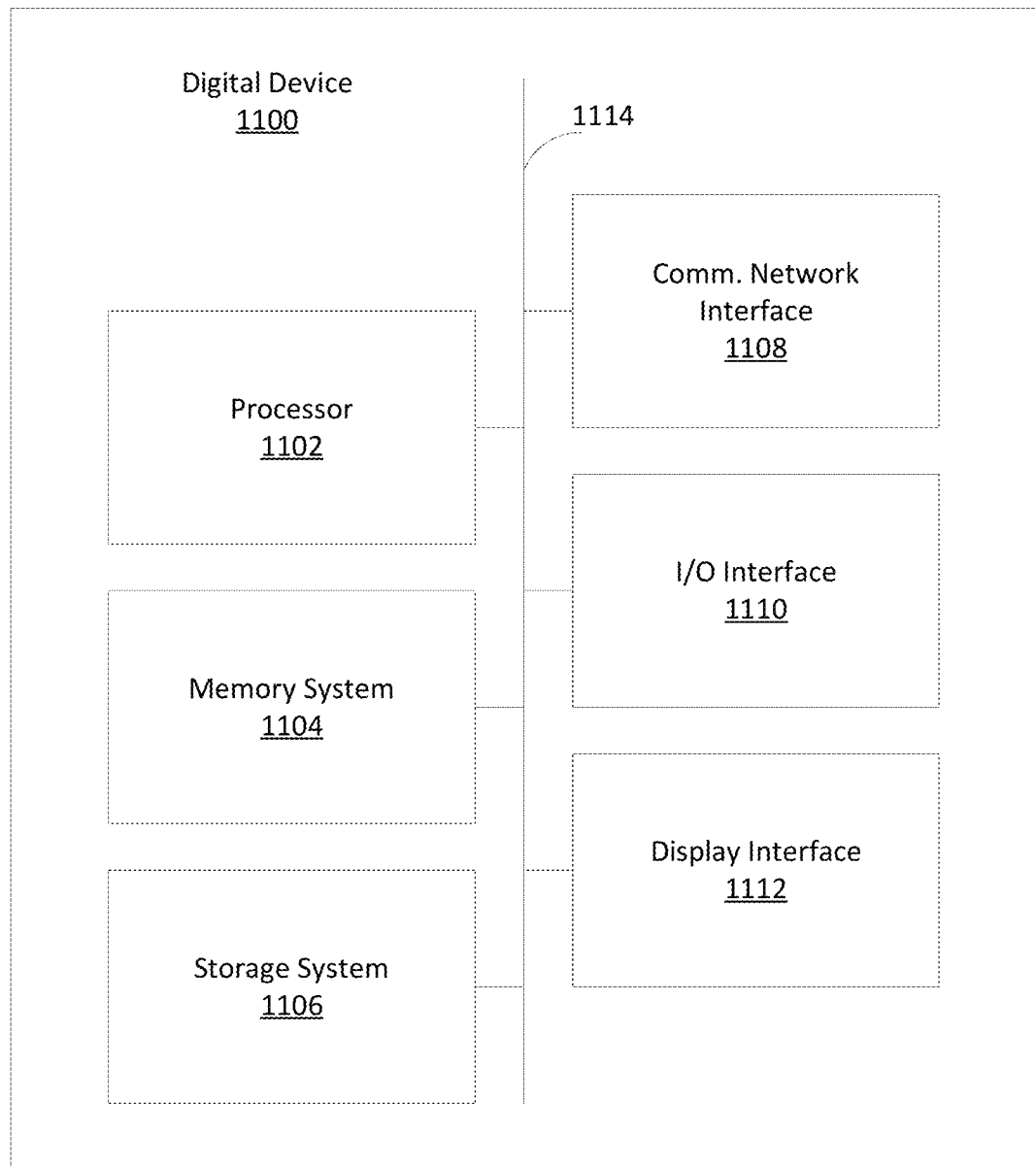
FIG. 11 depicts an exemplary digital device according to some embodiments.
Figure 13:
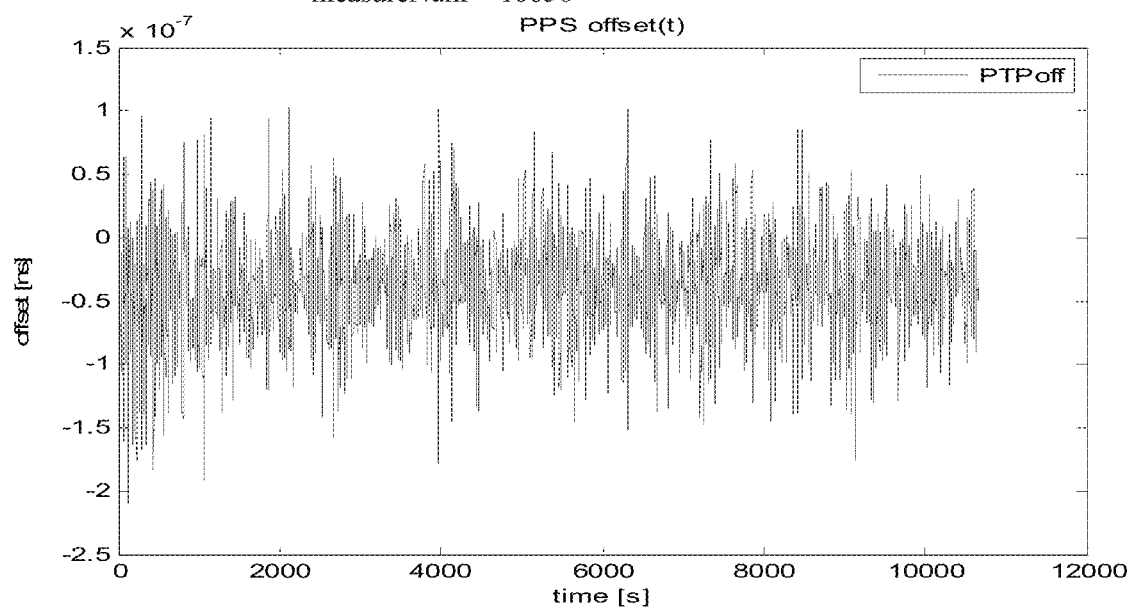
FIGS. 13-31 include output data and graphs related to output of separate simulations utilizing some embodiments described herein.
Figure 13:
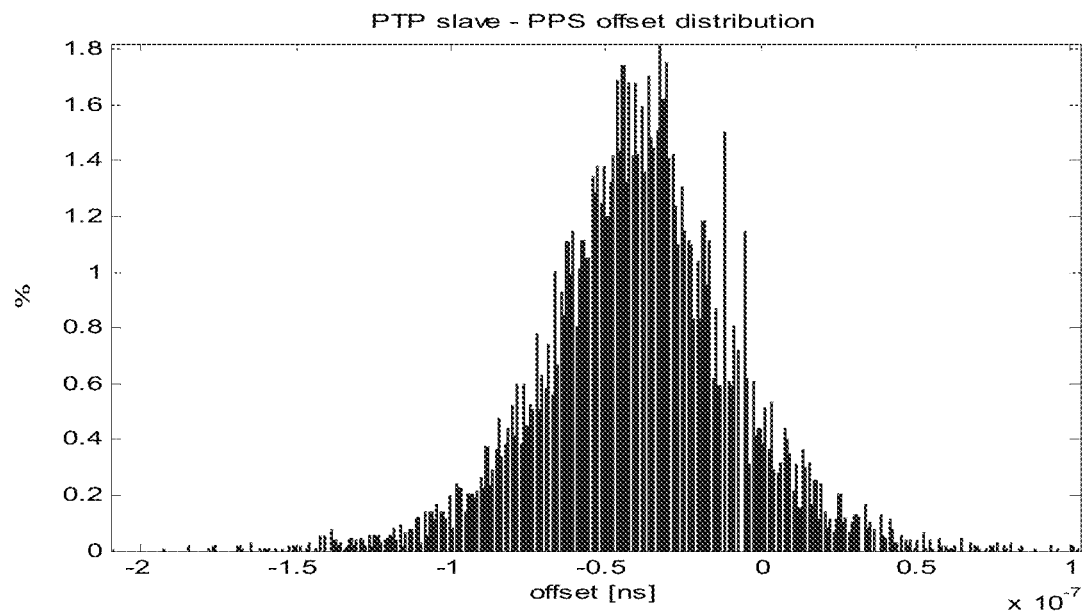
Figure 14:
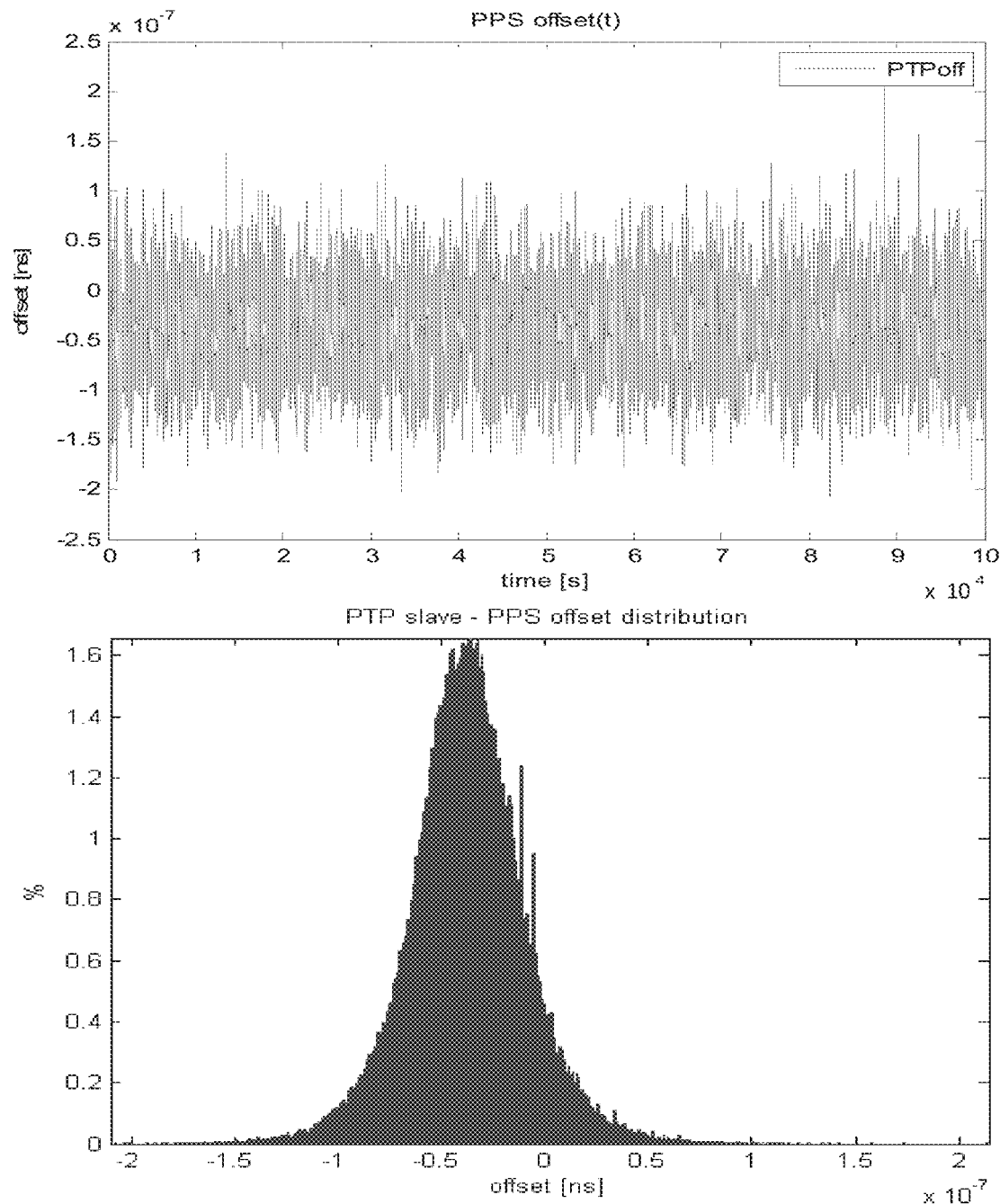
Figure 15:
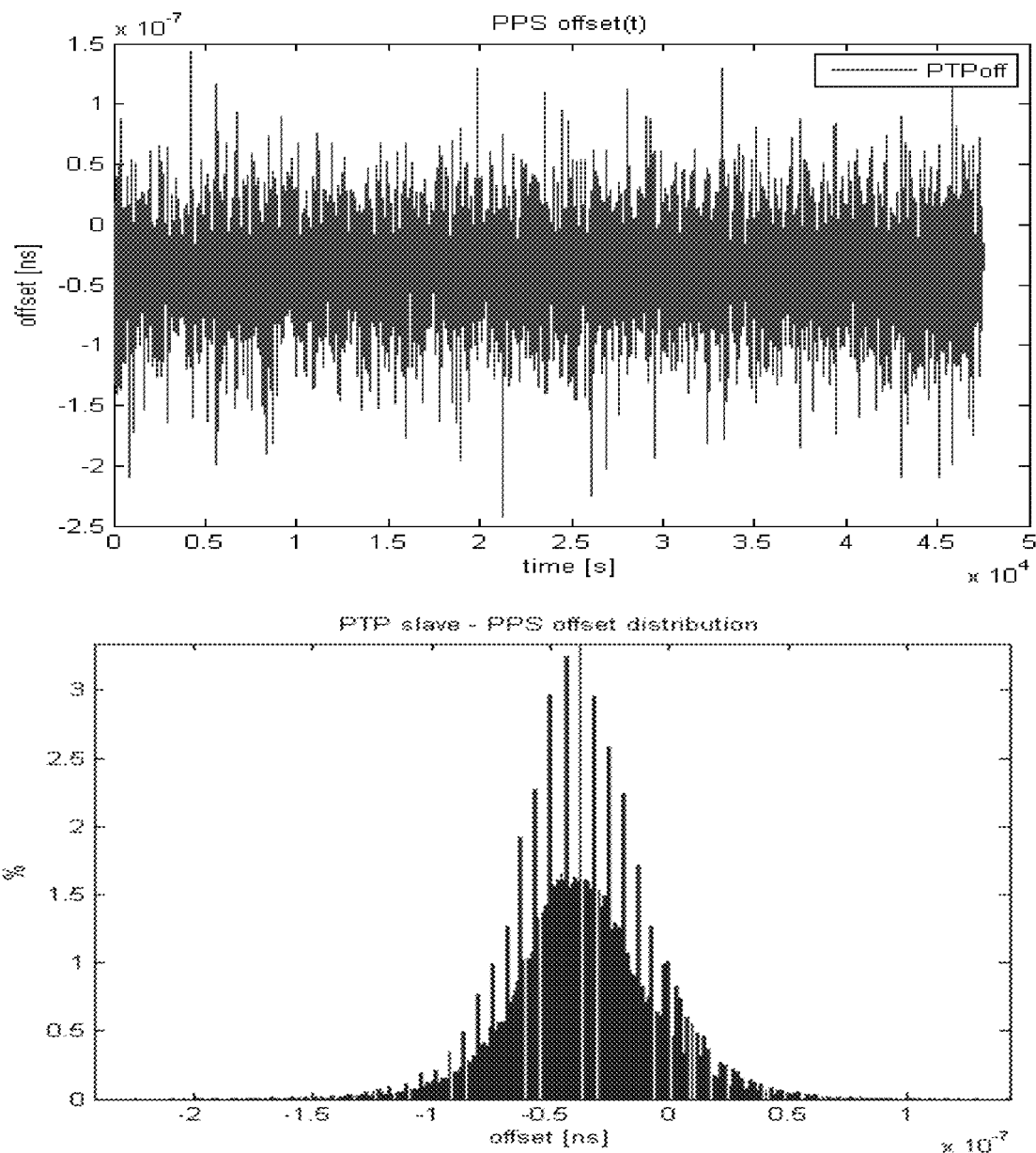
Figure 16:
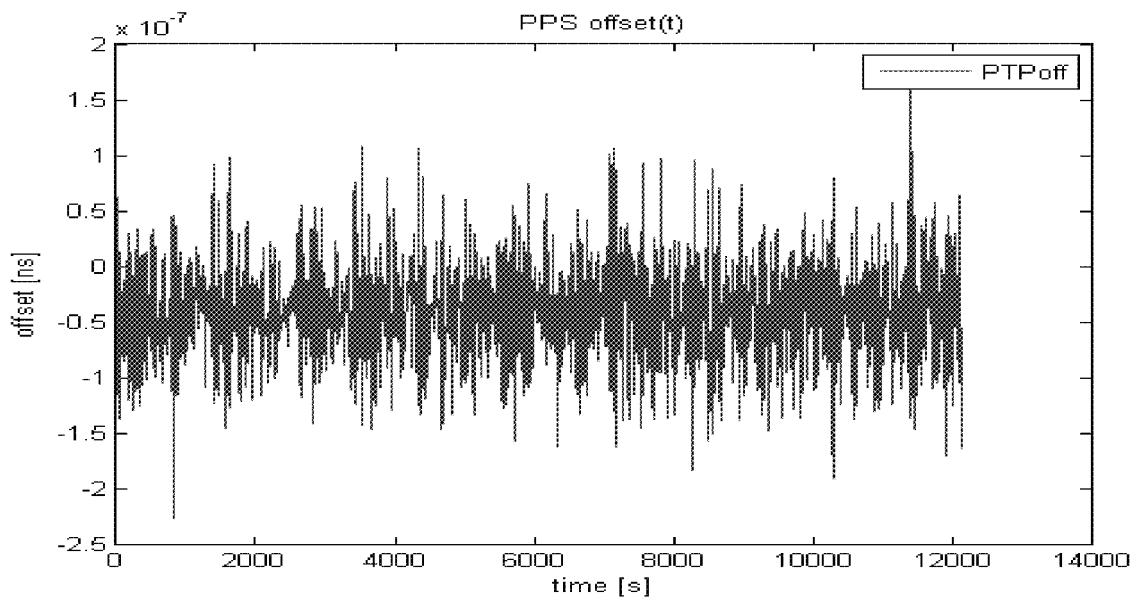
Figure 16:
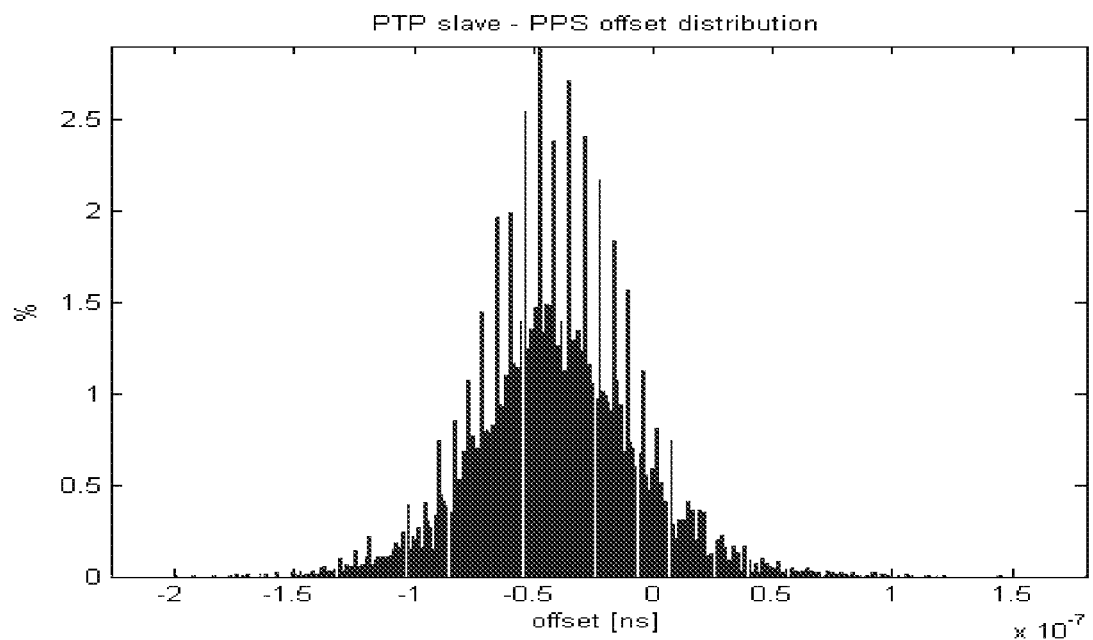
Figure 17:
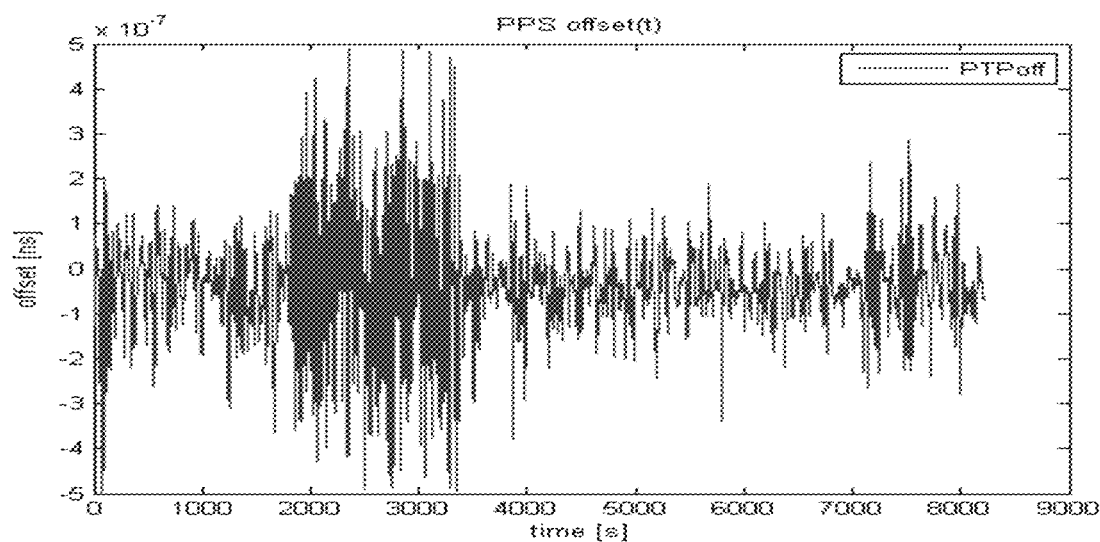
Figure 17:
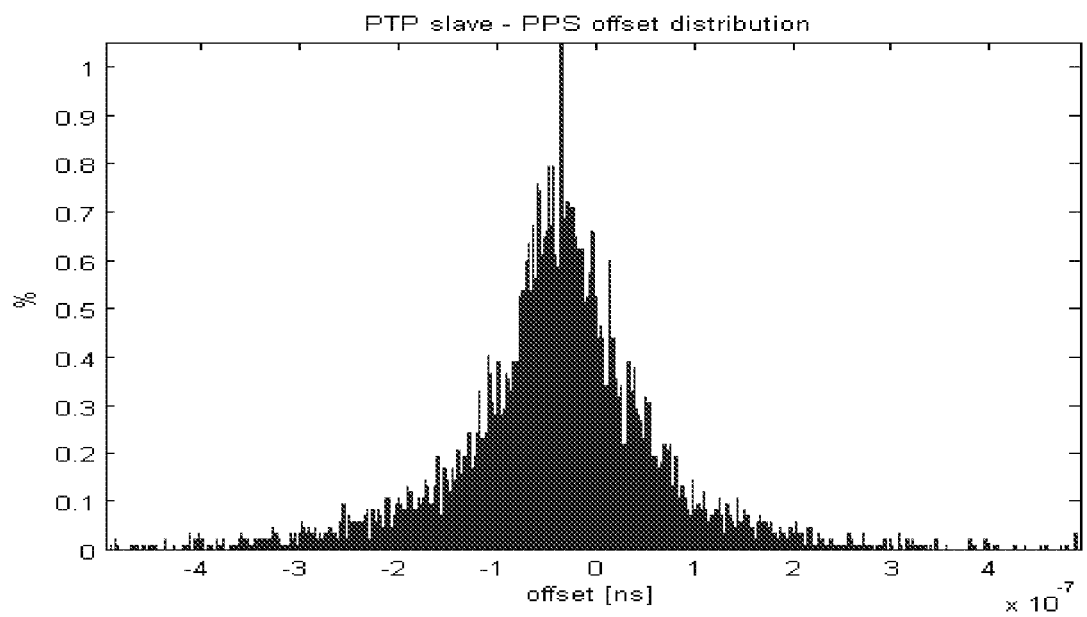
Figure 18:
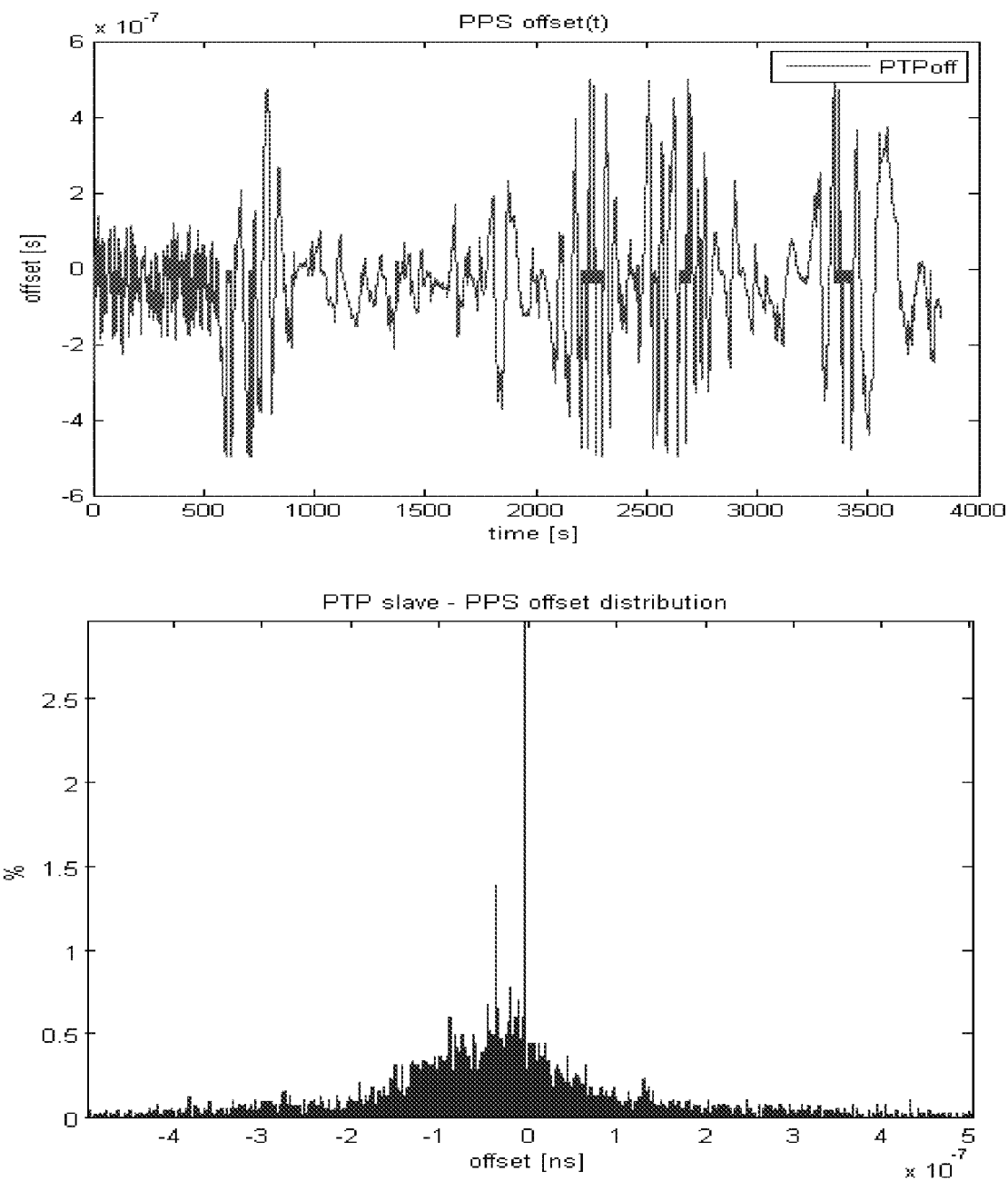
Figure 19:
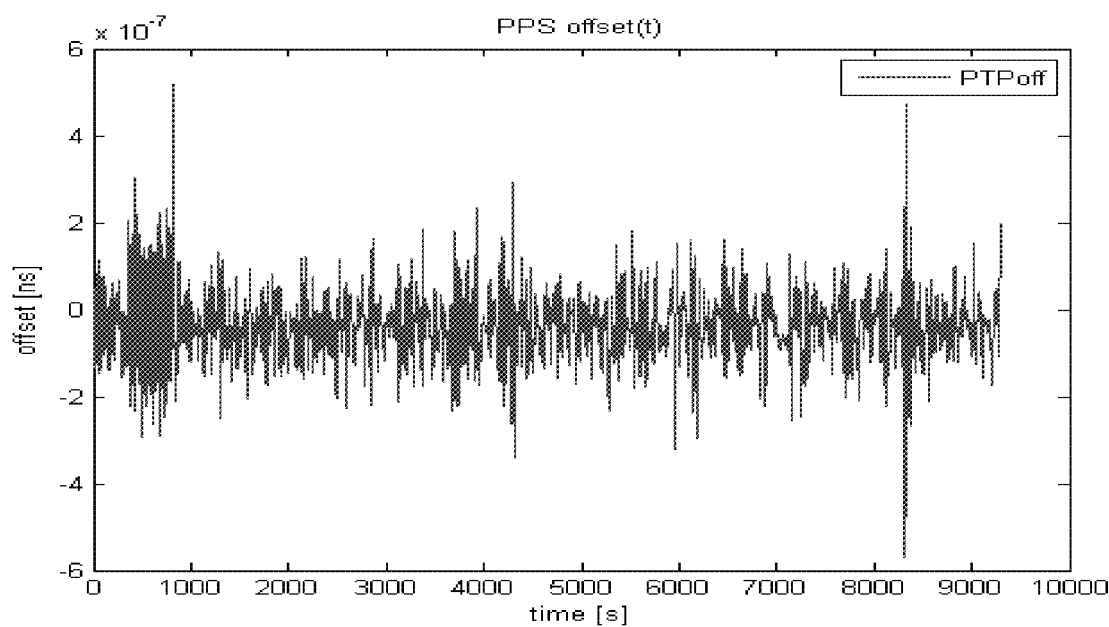
Figure 19:
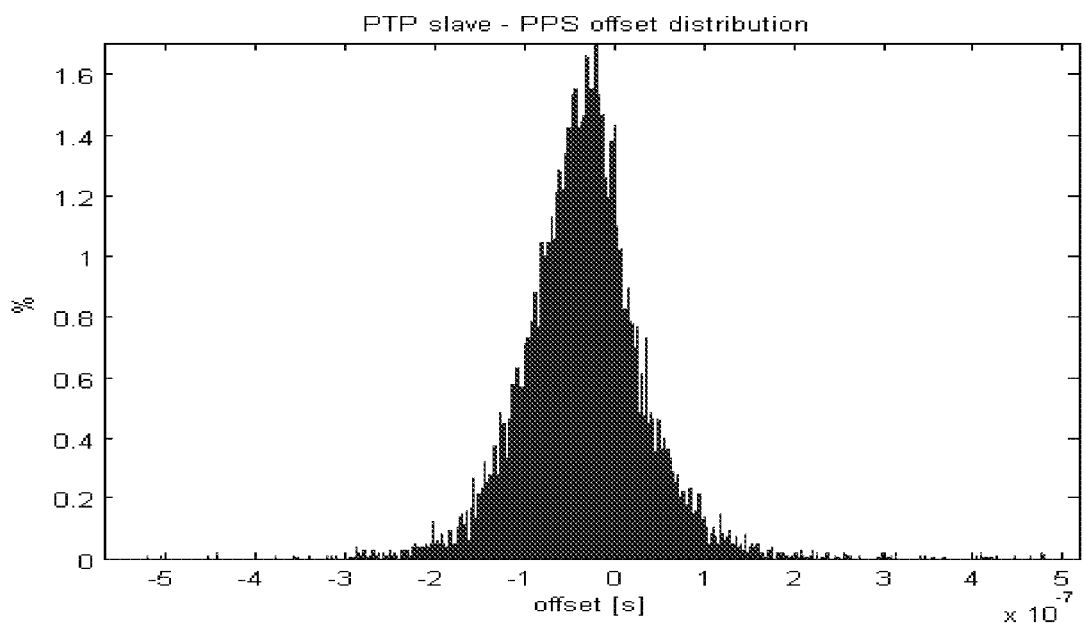
Figure 20:
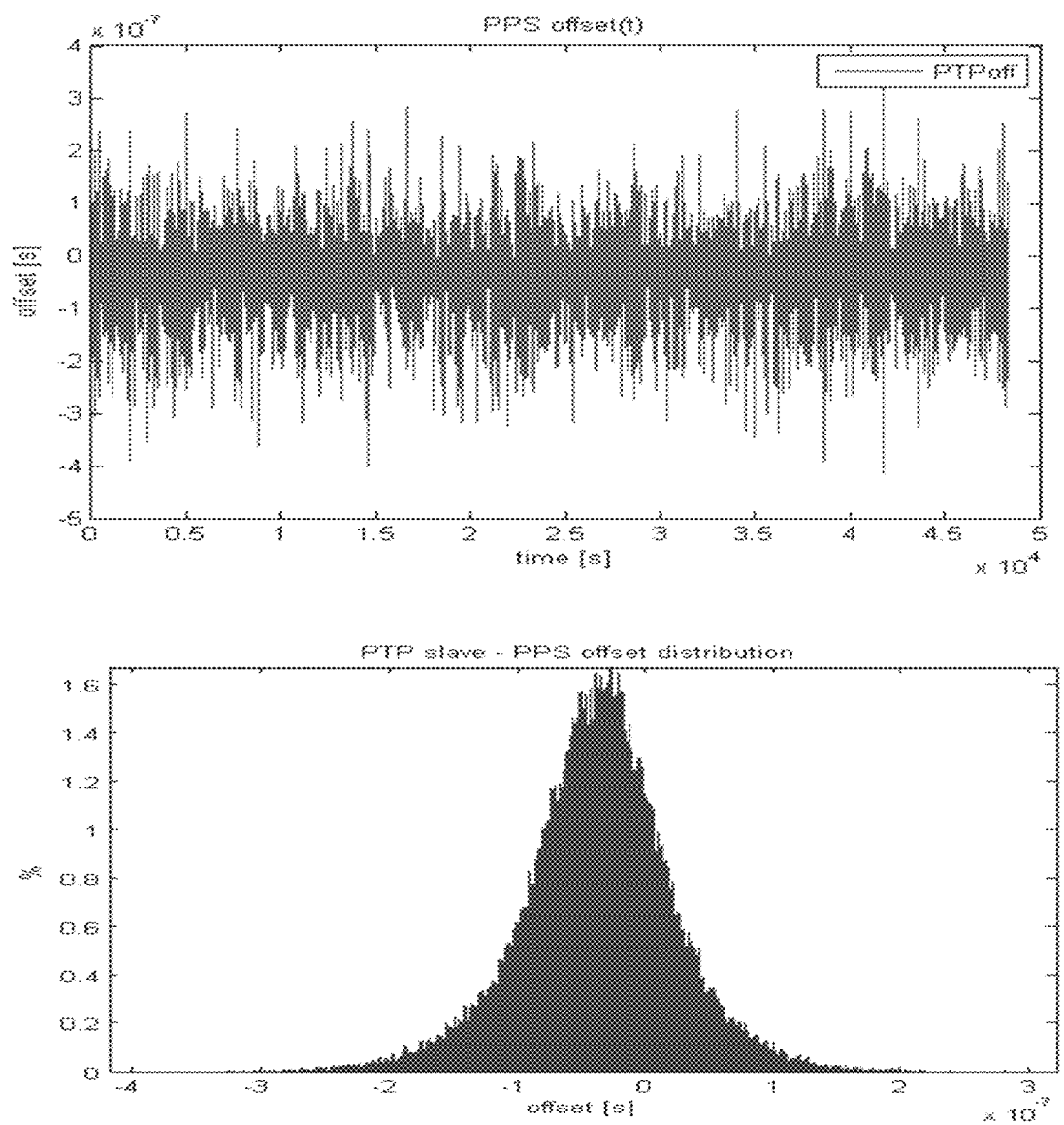
Figure 21:
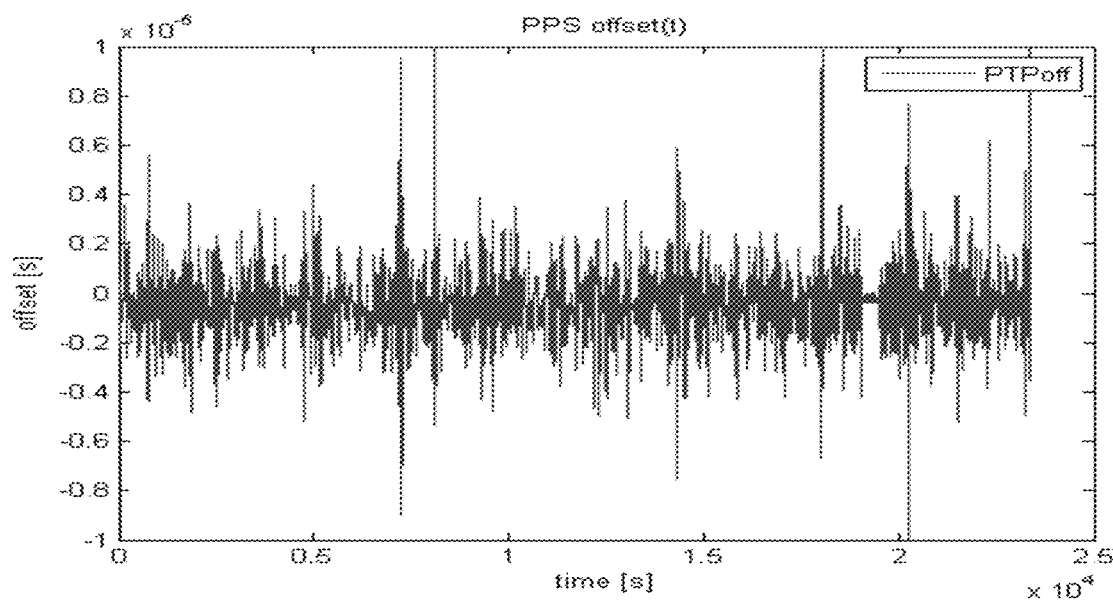
Figure 21:
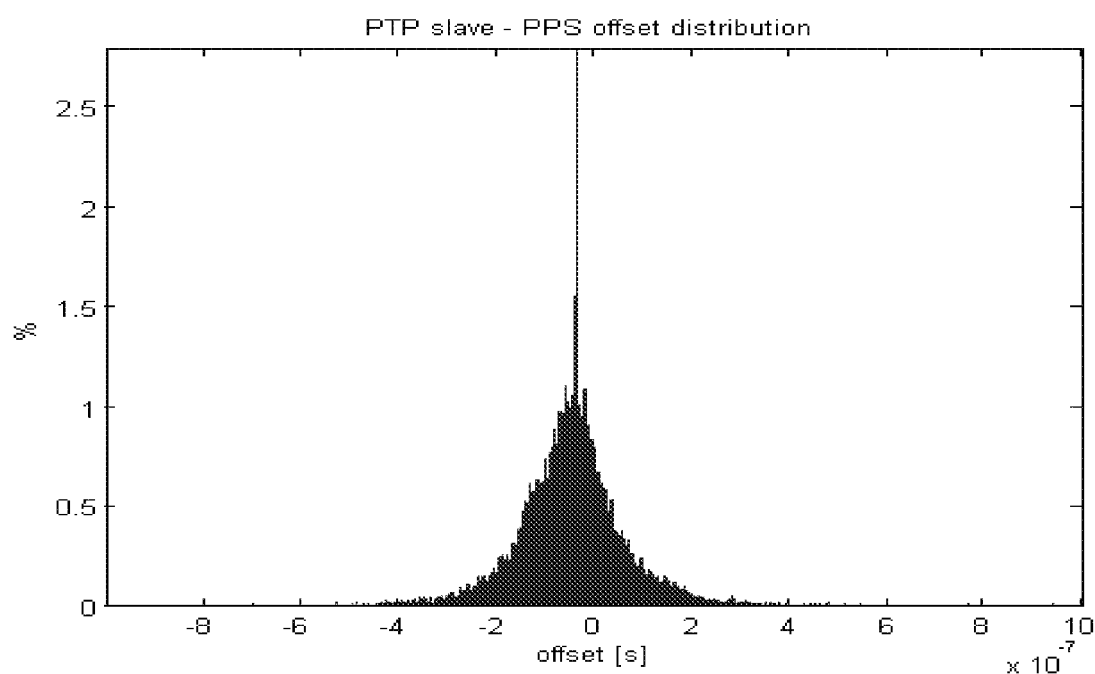
Figure 22:
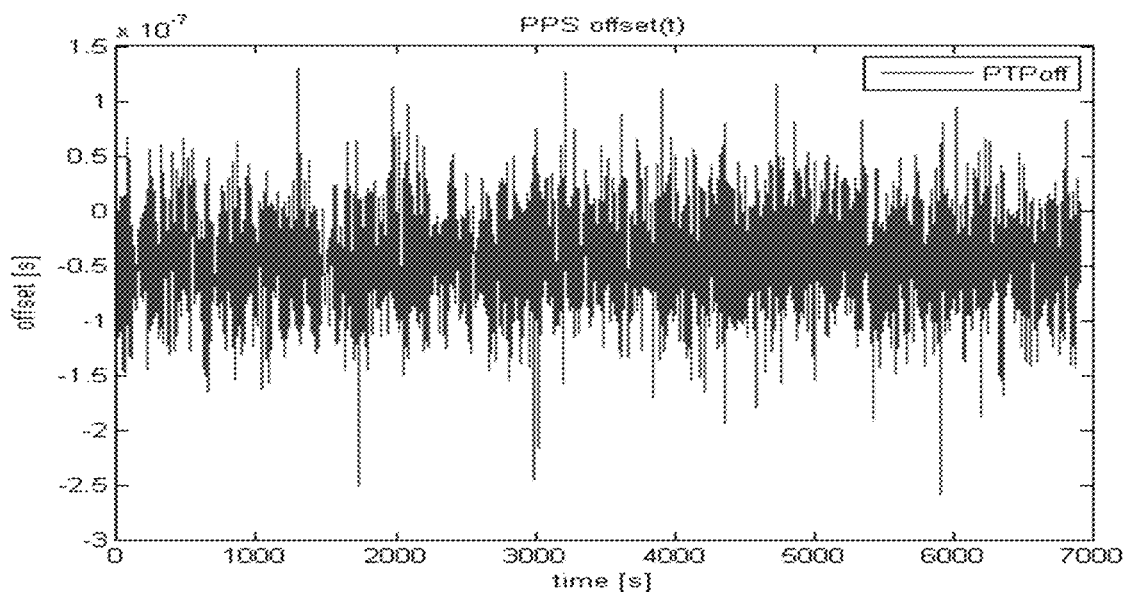
Figure 22:
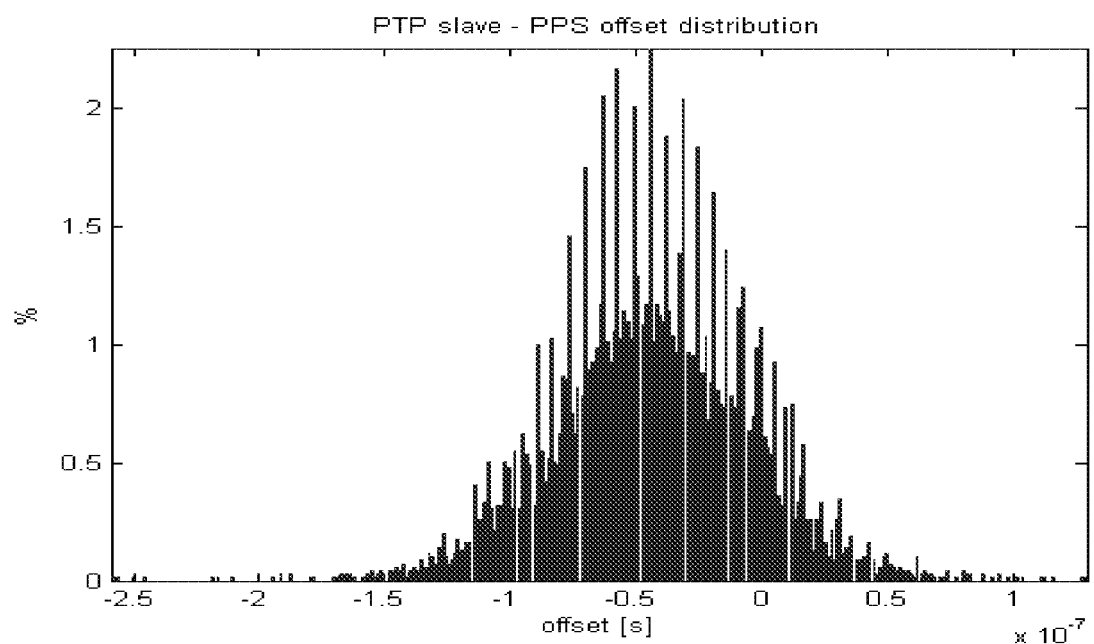
Figure 23:
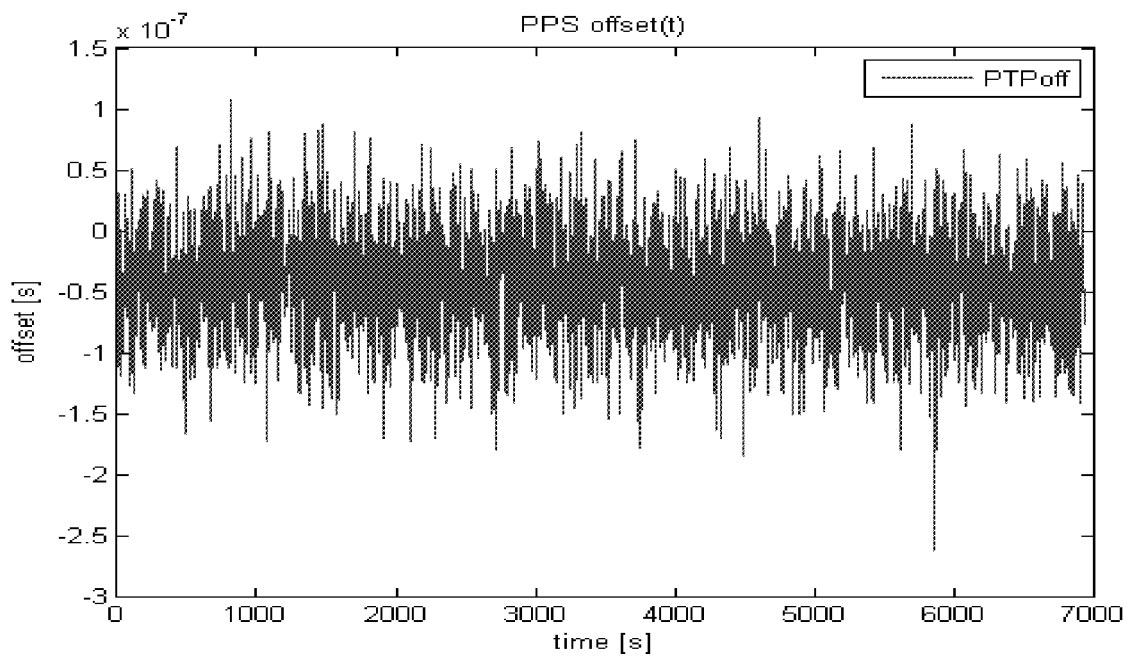
Figure 23:
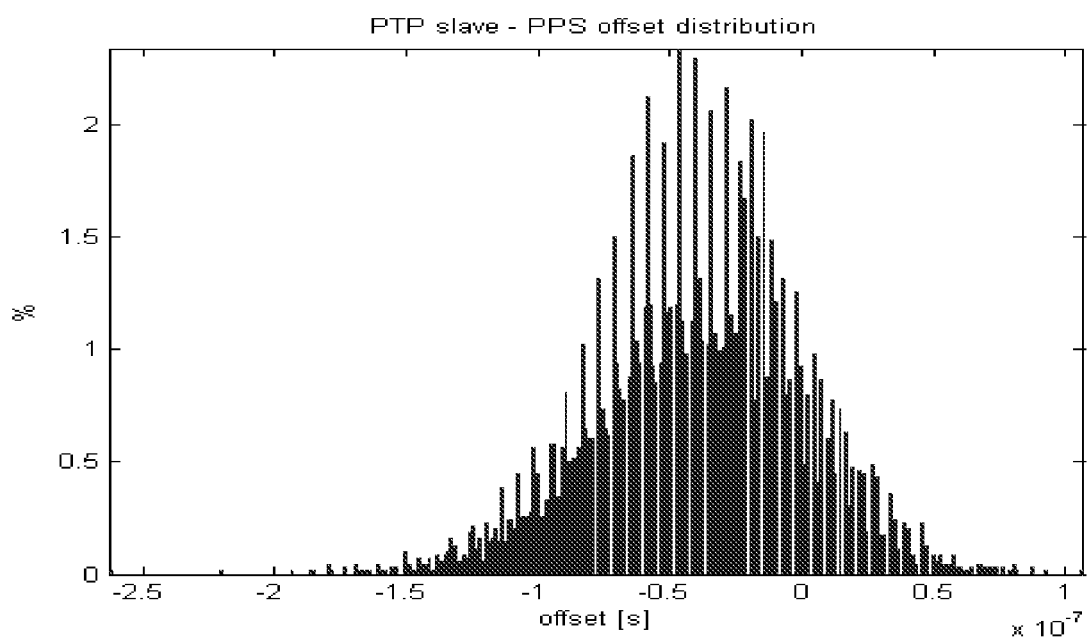
Figure 24:
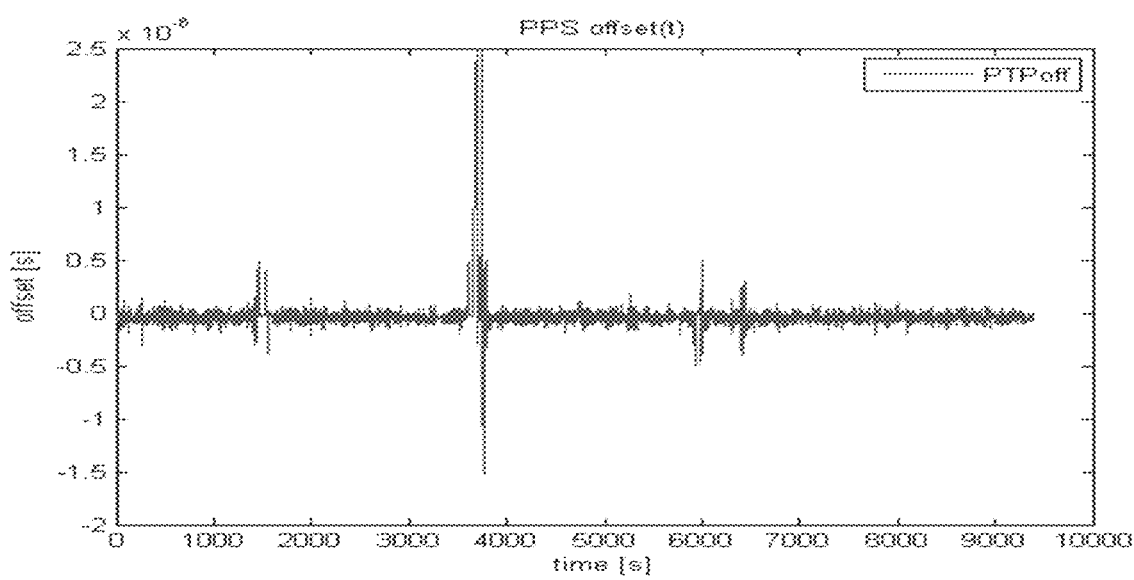
Figure 24:
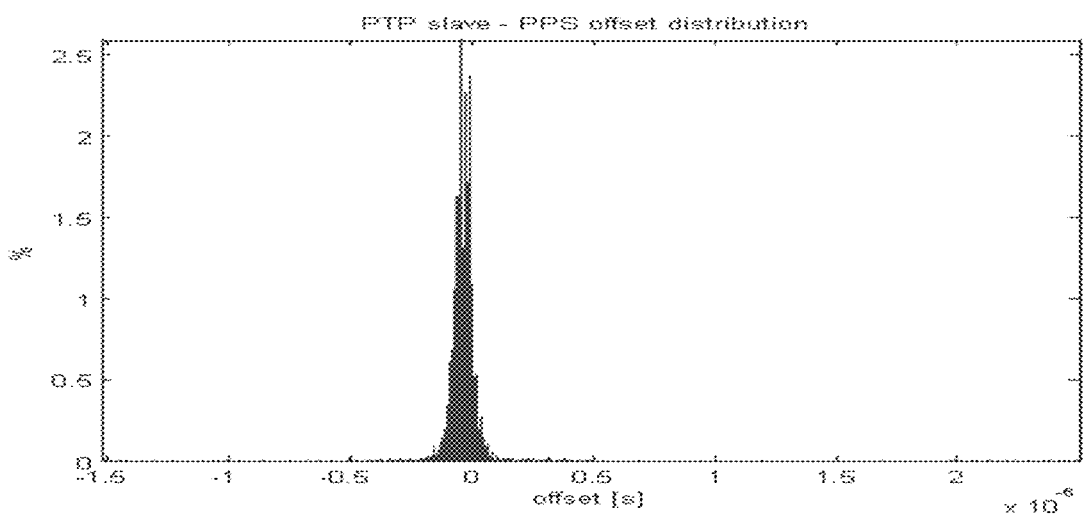
Figure 25:
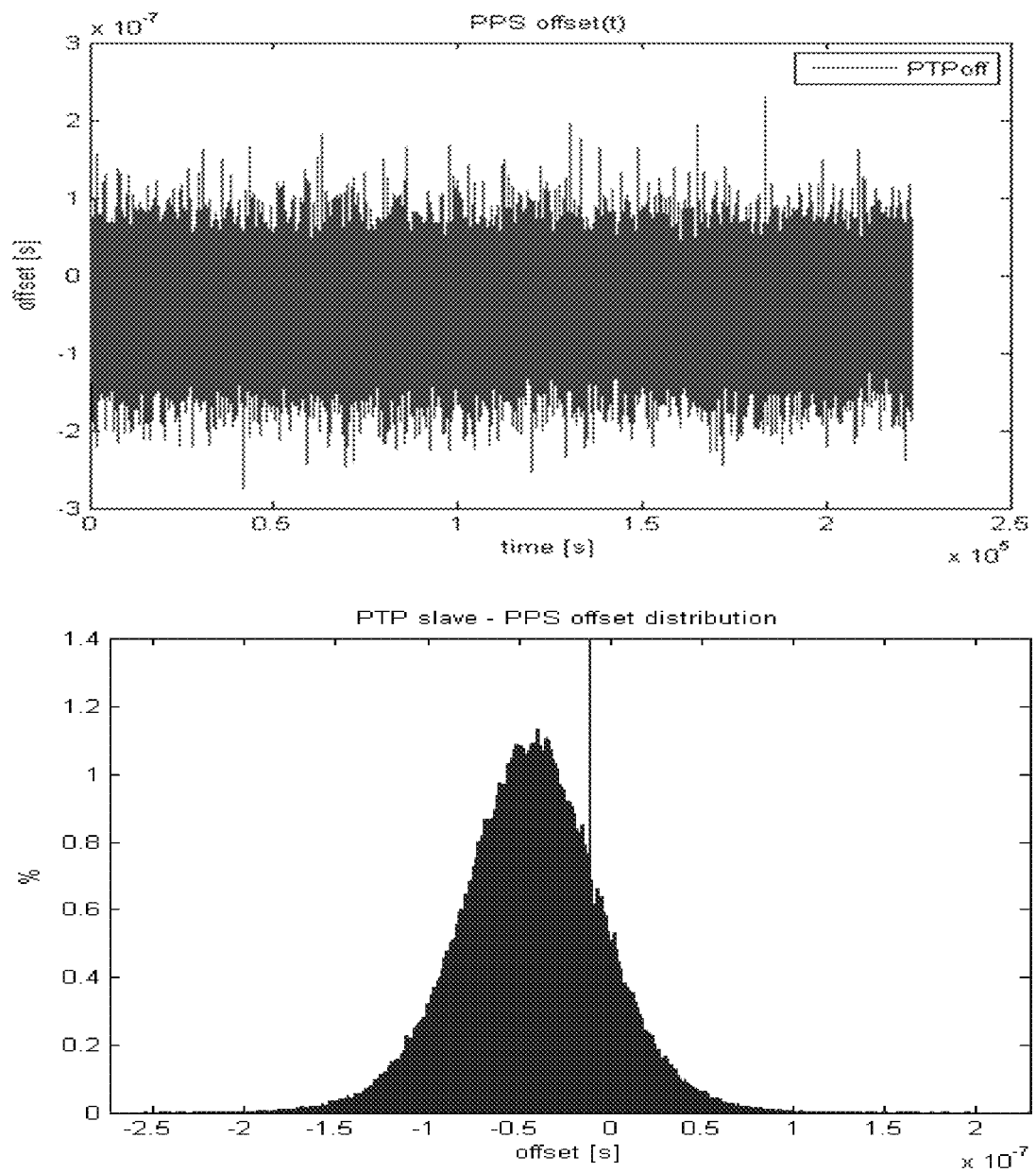
Figure 26:
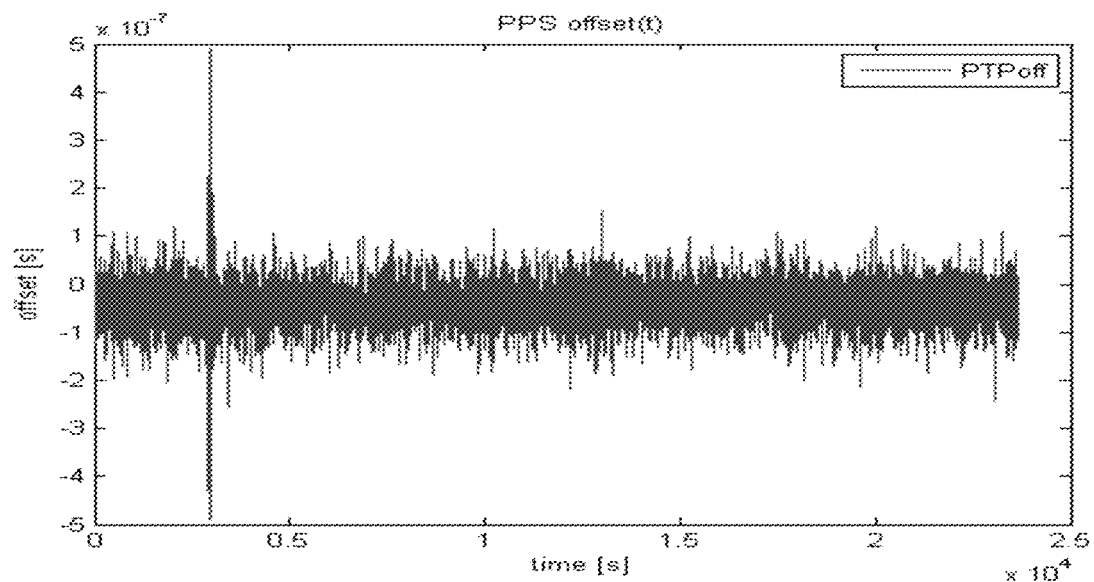
Figure 26:
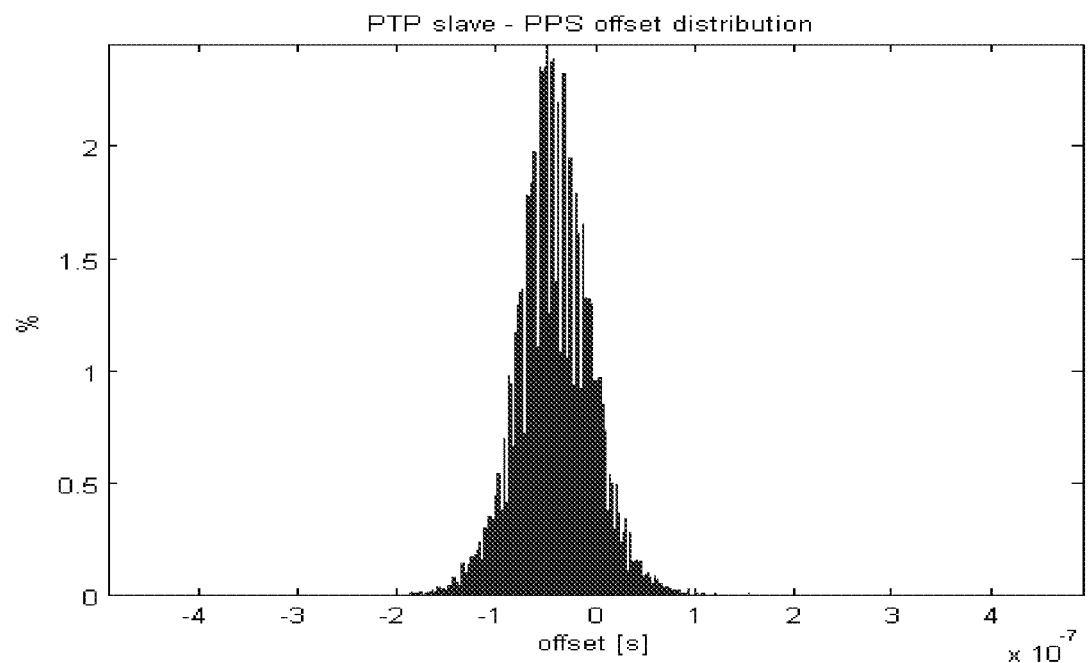
Figure 27:
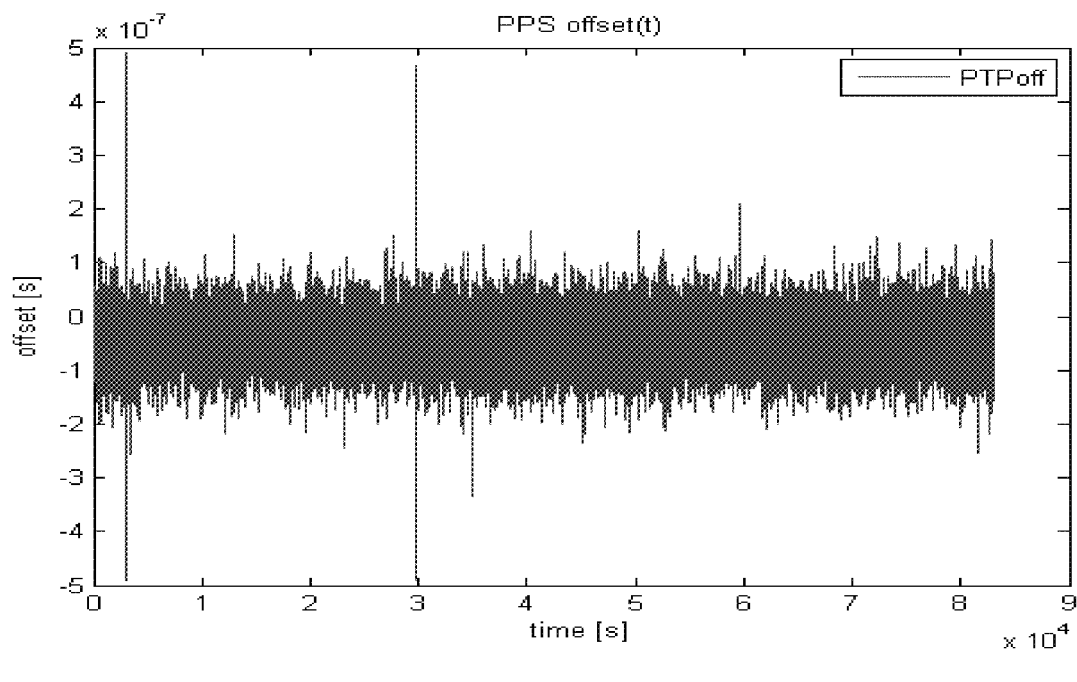
Figure 27:
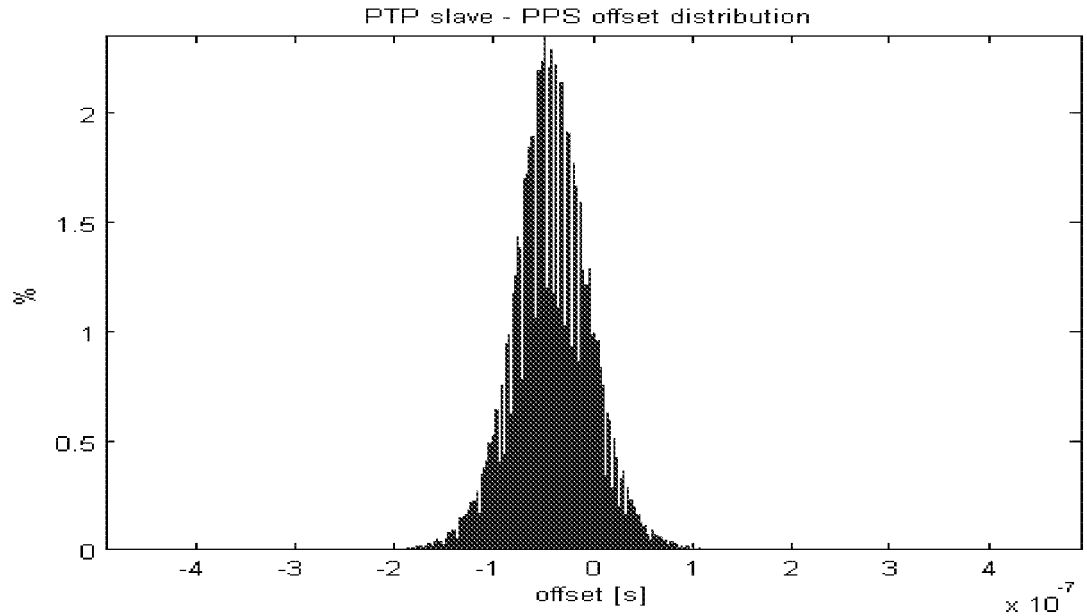
Figure 28:
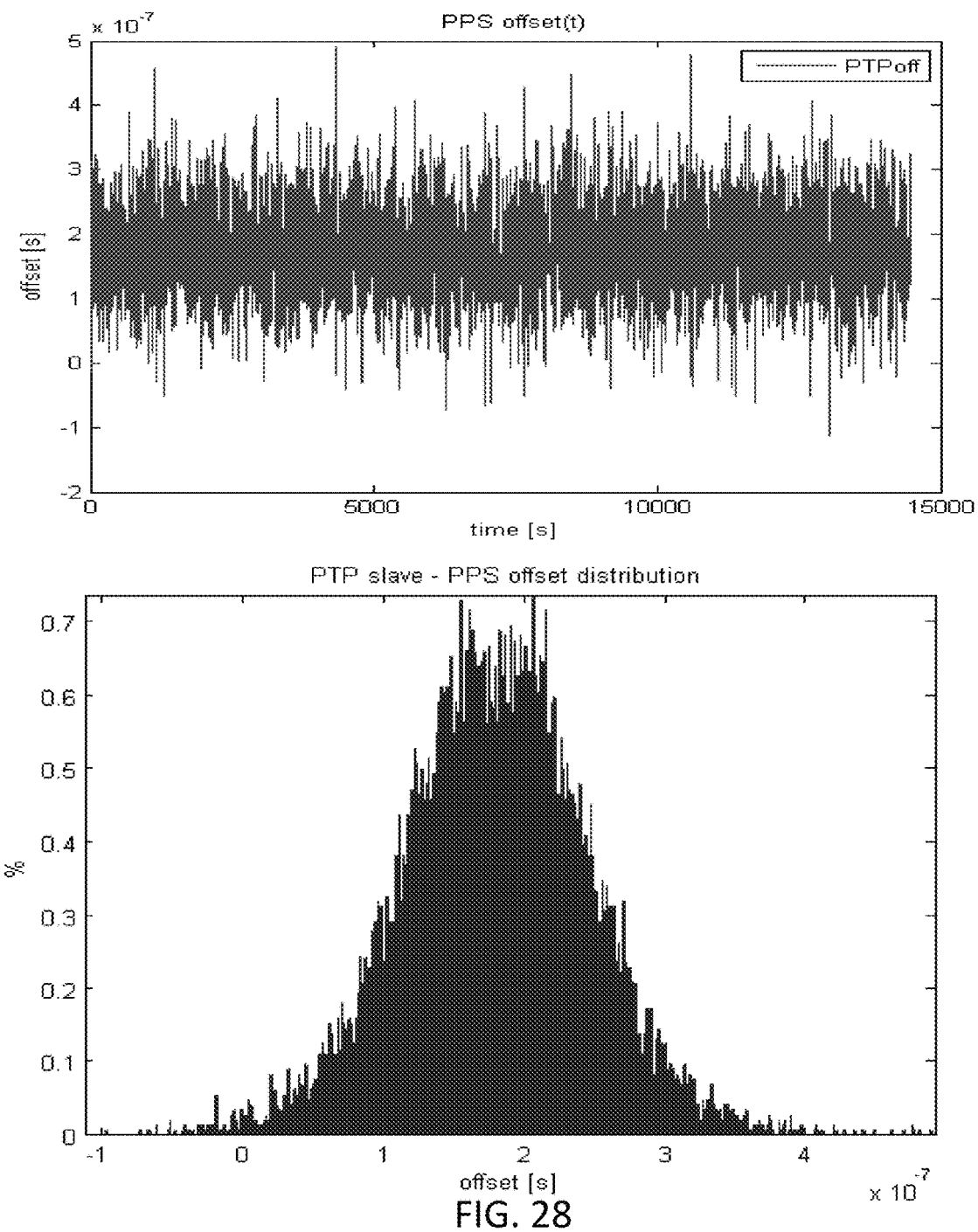
Figure 29:
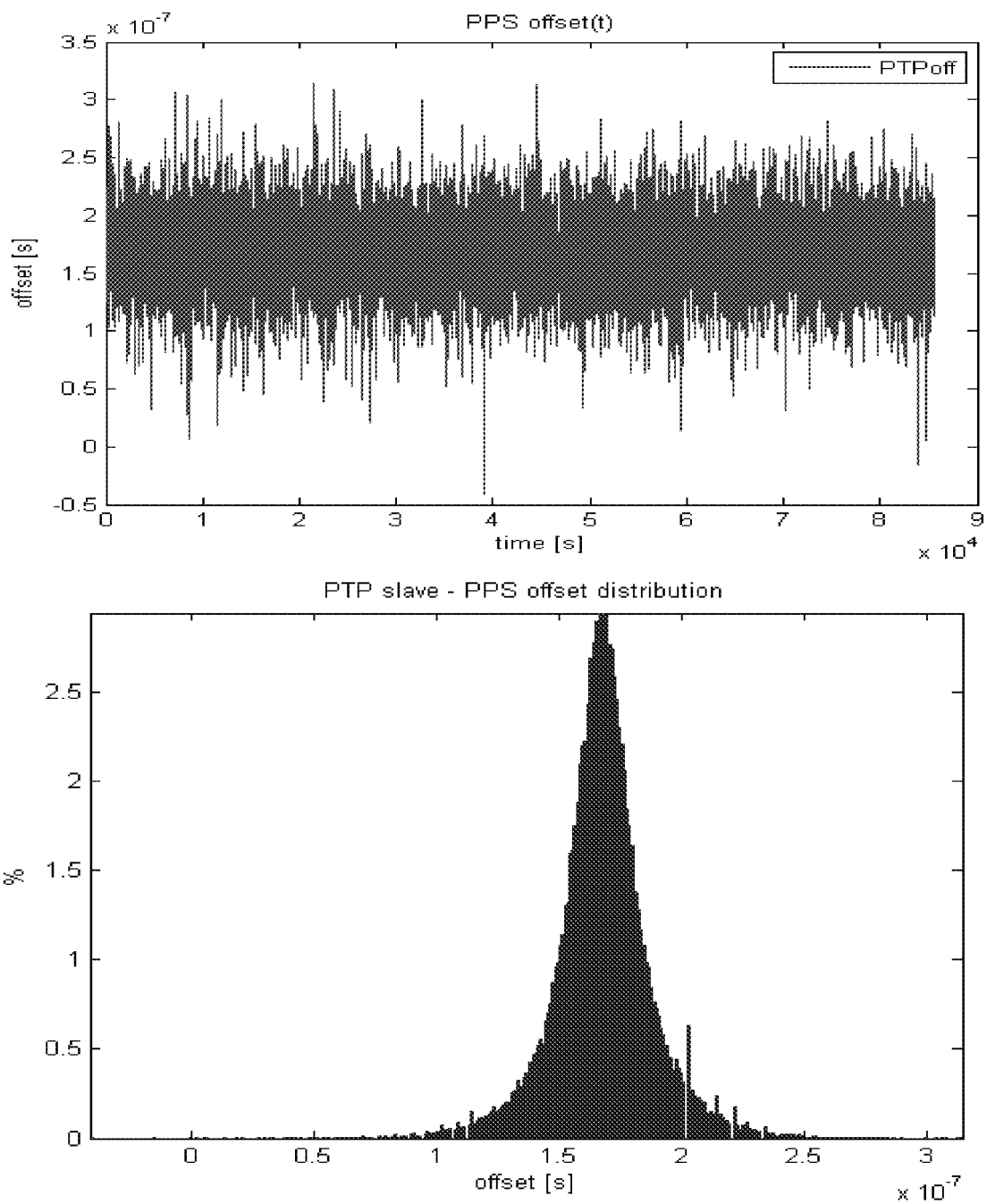
Figure 30:
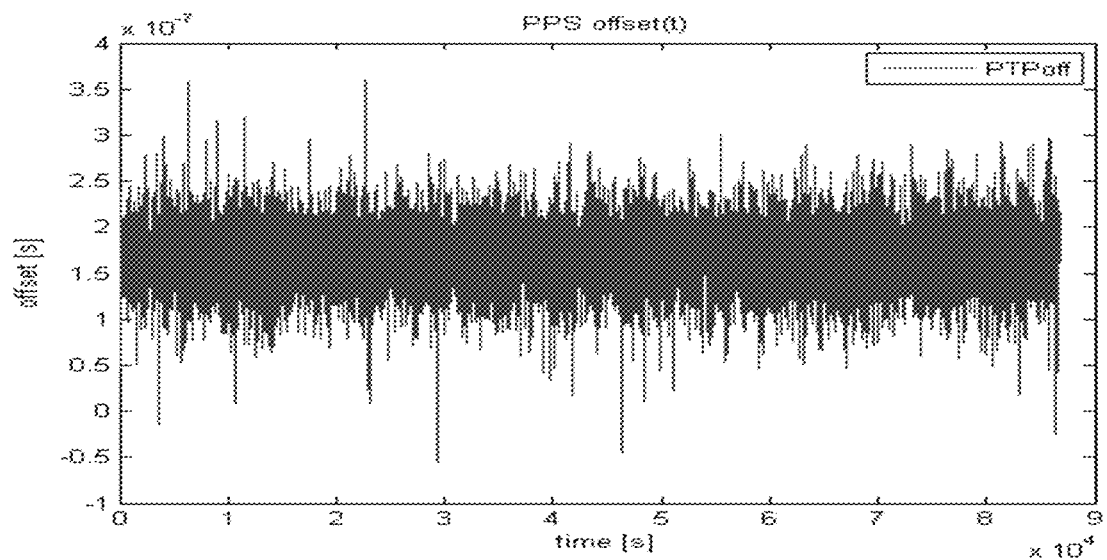
Figure 30:
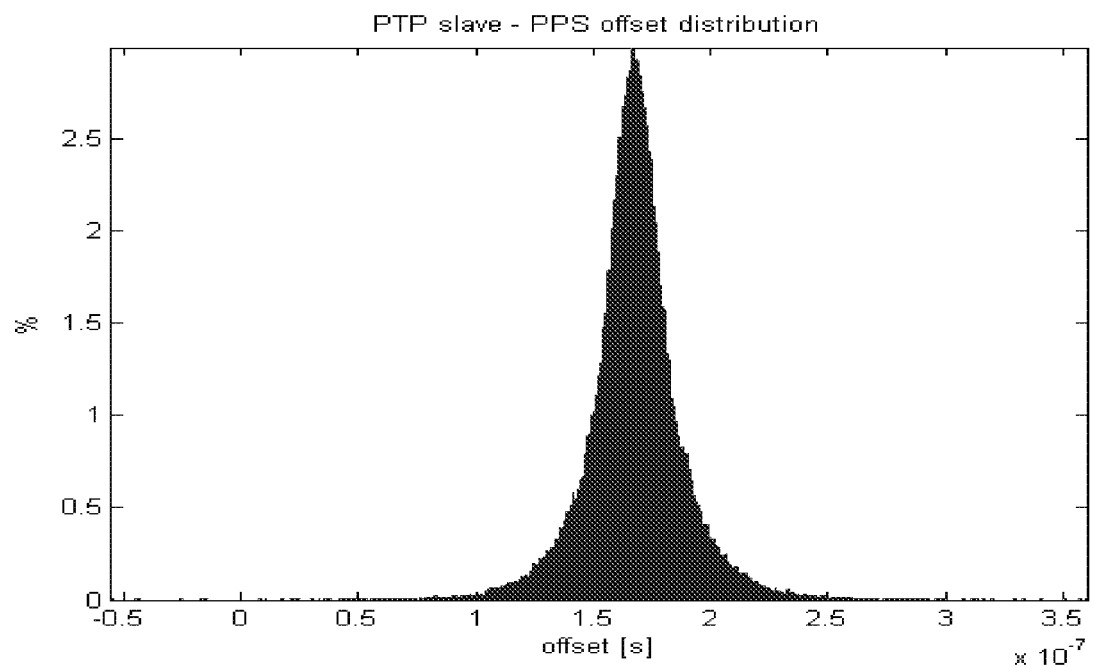
Figure 31:
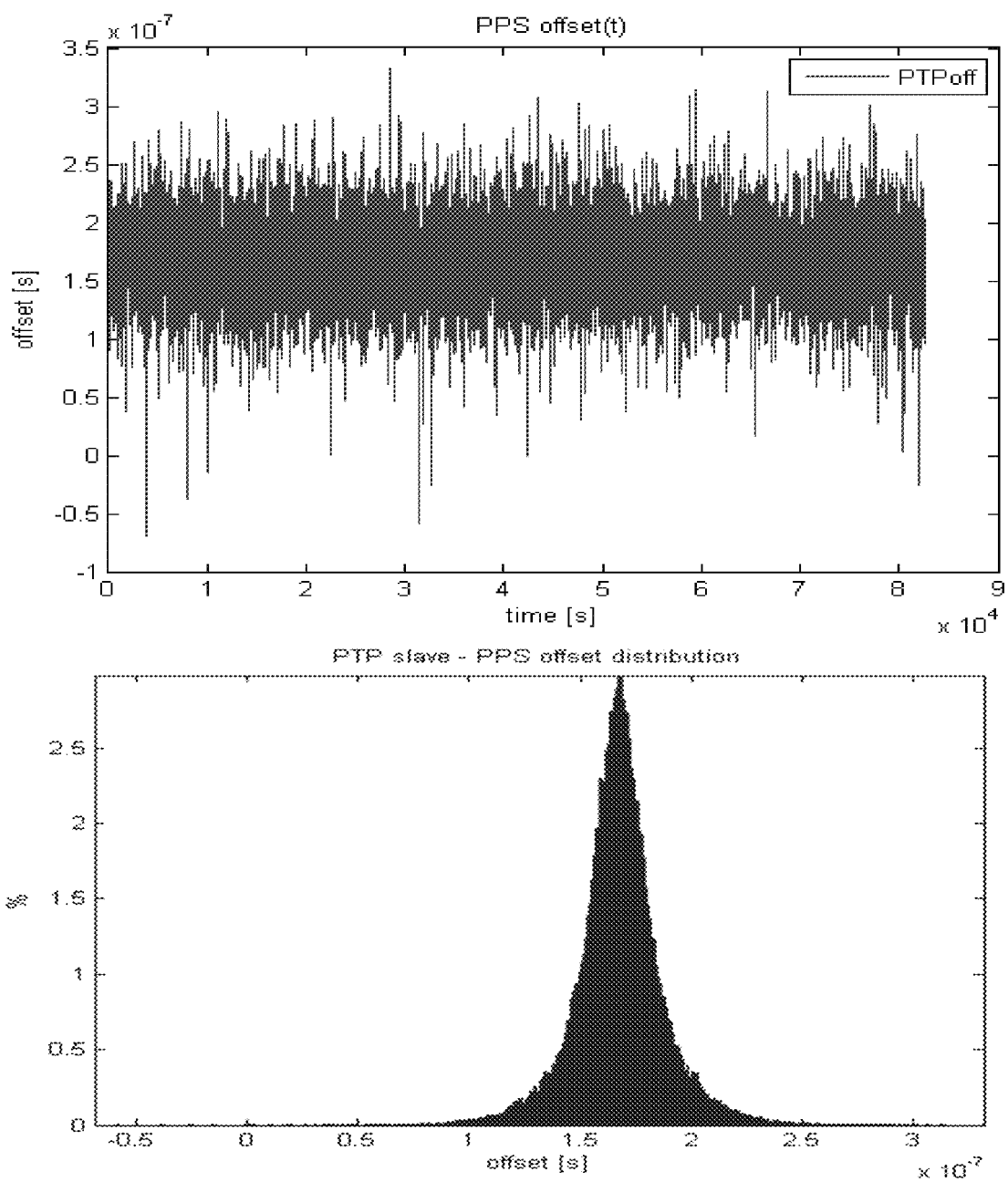

FIG. 11 depicts an exemplary digital device 1100 according to some embodiments. The digital device 1100 comprises a processor 1102, a memory system 1104, a storage system 1106, a communication network interface 1108, an I/O interface 1110, and a display interface 1112 communicatively coupled to a bus 1114. The processor 1102 may be configured to execute executable instructions (e.g., programs). In some embodiments, the processor 1102 comprises circuitry or any processor capable of processing the executable instructions.

The memory system 1104 is any memory configured to store data. Some examples of the memory system 1104 are storage devices, such as RAM or ROM. The memory system 1104 may comprise the RAM cache. In various embodiments, data is stored within the memory system 1104. The data within the memory system 1104 may be cleared or ultimately transferred to the storage system 1106.

The storage system 1106 is any storage configured to retrieve and store data. Some examples of the storage system 1106 are flash drives, hard drives, optical drives, and/or magnetic tape. In some embodiments, the digital device 1100 includes a memory system 1104 in the form of RAM and a storage system 1106 in the form of flash data. Both the memory system 1104 and the storage system 1106 comprise computer readable media that may store instructions or programs that are executable by a computer processor including the processor 1102.

The communication network interface (com. network interface) 1108 may be coupled to a data network (e.g., data network 1104 or 1114) via the link 1116. The communication network interface 1108 may support communication over an Ethernet connection, a serial connection, a parallel connection, or an ATA connection, for example. The communication network interface 1108 may also support wireless communication (e.g., 802.11 a/b/g/n, WiMAX). It will be apparent to those skilled in the art that the communication network interface 1108 may support many wired and wireless standards.

The optional input/output (I/O) interface 1110 is any device that receives input from the user and output data. The optional display interface 1112 is any device that may be configured to output graphics and data to a display. In one example, the display interface 1112 is a graphics adapter.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1102 and/or a co-processor located on a GPU.

FIG. 12 is a table including test data used in simulations related to test output FIGS. 13-31 utilizing some embodiments described herein. FIG. 12 includes the number of switches active, the amount of traffic simulated, the type of traffic simulated, standard deviation, minimum offset, maximum offset, mean offset, maximum delta MPD, Sync, and times.

FIGS. 13-31 include output data and graphs related to output of separate simulations utilizing some embodiments described herein.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

The invention claimed is:

1. A method of synchronizing a first clock and a second clock, the method comprising:
transmitting across a channel a plurality of packets between a first device with a first clock having a first clock time and a second device with a second clock having a second clock time;
obtaining a minimum path delay or a mean path delay of the channel;
obtaining a first time when a first sync packet of the plurality of packets is sent from the first device to the second device, the first time being based on the first clock;
obtaining a second time when the first sync packet of the plurality of packets is received by the second device, the second time being based on the second clock;
obtaining a third time when a first response packet from the second device is sent to the first device in response to the first sync packet, the third time being based on the second clock;
obtaining a fourth time when the first response packet from the second device is received by the first device, the fourth time being based on the first clock;
computing a first path delay across the channel of the first sync packet and the first response packet;
determining whether the first path delay satisfies a condition involving the minimum path delay or the mean path delay;
obtaining a fifth time when a second sync packet of the plurality of packets is sent from the first device to the second device, the fifth time being based on the first clock;
obtaining a sixth time when the second sync packet of the plurality of packets is received by the second device, the sixth time being based on the second clock;
obtaining a seventh time when a second response packet from the second device is sent to the first device in response to the second sync packet, the seventh time being based on the second clock;
obtaining an eighth time when the second response packet from the second device is received by the first device, the eighth time being based on the first clock;
computing a second path delay across the channel of the second sync packet and the second response packet;
determining whether the second path delay satisfies the condition involving the minimum path delay or the mean path delay; and
if at least each of the first path delay and the second path delay satisfies the condition, then:
computing a first skew between the first time and the fifth time and a second skew between the second time and the sixth time, or computing the first skew between the fourth time and the eighth time and the second skew between the third time and the seventh time;
computing a ratio based on the first skew and the second skew;
computing a first difference between the fourth time and the first time and a second difference between the third time and the second time, or computing the first difference between the eighth time and the fifth time and the second difference between the seventh time and the sixth time;
adjusting one of the first difference or the second difference based on the ratio;
computing a packet trip delay based on the first difference and the second difference, as adjusted;
computing an offset between the first clock and the second clock based on the packet trip delay and any of the first time and the second time, the third time and the fourth time, the fifth time and the sixth time, or the seventh time and the eighth time; and
correcting, based on the offset, the second clock time of the second clock if the second difference is adjusted or the first clock time of the first clock if the first difference is adjusted.

2. The method of claim 1, wherein the minimum path delay or the mean path delay is an estimate.

3. The method of claim 1, wherein the determining whether the first path delay satisfies the condition involving the minimum path delay or the mean path delay includes determining whether the first path delay is below a threshold path delay based on the minimum path delay or the mean path delay.

4. The method of claim 1, further comprising:
if at least each of the first path delay and the second path delay satisfies the condition, then correcting one of a second clock rate of the second clock or a first clock rate of the first clock based on the ratio.

5. The method of claim 1, wherein the computing the offset between the first clock and the second clock comprises computing T2−T1−PTD wherein T2 is the second time, T1 is the first time, and PTD is the packet trip delay.

6. The method of claim 1, wherein the computing the offset between the first clock and the second clock comprises computing T3−T4+PTD wherein T3 is the third time, T4 is the first time, and PTD is the packet trip delay.

7. The method of claim 1, further comprising computing a set of packet trip delays for a set of the plurality of packets.

8. The method of claim 7, further comprising determining the minimum path delay or the mean path delay based on the set of packet trip delays.

9. The method of claim 1, wherein the first device is a master device and the second device is a slave device.

10. The method of claim 9, wherein the adjusting the one of the first difference or the second difference includes adjusting the second difference, and the correcting the second clock time of the second clock or the first clock time of the first clock includes correcting the second clock time of the second clock.

11. A system for synchronizing a first clock and a second clock, the system comprising:
a communication module configured to transmit across a channel a plurality of packets between a first device with a first clock having a first clock time and a second device with a second clock having a second clock time;
at least one processor configured to:
obtain a minimum path delay or a mean path delay of the channel;
obtain a first time when a first sync packet of the plurality of packets is sent from the first device to the second device, the first time being based on the first clock;
obtain a second time when the first sync packet of the plurality of packets is received by the second device, the second time being based on the second clock;
obtain a third time when a first response packet from the second device is sent to the first device in response to the first sync packet, the third time being based on the second clock;
obtain a fourth time when the first response packet from the second device is received by the first device, the fourth time being based on the first clock;
compute a first path delay across the channel of the first sync packet and the first response packet;
determine whether the first path delay satisfies a condition involving the minimum path delay or the mean path delay;
obtain a fifth time when a second sync packet of the plurality of packets is sent from the first device to the second device, the fifth time being based on the first clock;
obtain a sixth time when the second sync packet of the plurality of packets is received by the second device, the sixth time being based on the second clock;
obtain a seventh time when a second response packet from the second device is sent to the first device in response to the second sync packet, the seventh time being based on the second clock;
obtain an eighth time when the second response packet from the second device is received by the first device, the eighth time being based on the first clock;
compute a second path delay across the channel of the second sync packet and the second response packet;
determine whether the second path delay satisfies the condition involving the minimum path delay or the mean path delay; and
if at least each of the first path delay and the second path delay satisfies the condition, then:
compute a first skew between the first time and the fifth time and a second skew between the second time and the sixth time, or computing the first skew between the fourth time and the eighth time and the second skew between the third time and the seventh time;
compute a ratio based on the first skew and the second skew;
compute a first difference between the fourth time and the first time and a second difference between the third time and the second time, or compute the first difference between the eighth time and the fifth time and the second difference between the seventh time and the sixth time;
adjust one of the first difference or the second difference based on the ratio;
compute a packet trip delay based on the first difference and the second difference, as adjusted; and
compute an offset between the first clock and the second clock based on the packet trip delay and any of the first time and the second time, the third time and the fourth time, the fifth time and the sixth time, or the seventh time and the eighth time; and
a rate correction module configured to correct, based on the offset, the second clock time of the second clock if the second difference is adjusted or the first clock time of the first clock if the first difference is adjusted.

12. The system of claim 11, wherein the minimum path delay or the mean path delay is an estimate.

13. The system of claim 11, wherein the rate correction module determines whether the first path delay satisfies the condition by determining whether the first path delay is below a threshold path delay based on the minimum path delay or the mean path delay.

14. The system of claim 11, wherein the at least one processor is further configured to:
if at least each of the first path delay and the second path delay satisfies the condition, then correcting one of a second clock rate of the second clock or a first clock rate of the first clock based on the ratio.

15. The system of claim 11, wherein the at least one processor computes the offset between the first clock and the second clock by computing T2−T1−PTD wherein T2 is the second time, T1 is the first time, and PTD is the packet trip delay.

16. The system of claim 11, wherein the at least one processor computes the offset between the first clock and the second clock by computing T3−T4+PTD wherein T3 is the third time, T4 is the first time, and PTD is the packet trip delay.

17. The system of claim 11, wherein the at least one processor is further configured to obtain a set of packet trip delays for a set of the plurality of packets.

18. The system of claim 17, wherein the at least one processor is configured to compute the minimum path delay or the mean path delay based on the set of packet trip delays.

19. A non-transitory computer readable medium comprising executable instructions, the instructions being executable by a processor to perform a method of synchronizing a first clock having a first clock time in a first device and a second clock having a second clock time in a second device, the first device and the second device communicating a plurality of packets across a channel, the method comprising:
    obtaining a minimum path delay or a mean path delay of the channel;
    obtaining a first time when a first sync packet of the plurality of packets is sent from the first device to the second device, the first time being based on the first clock;
    obtaining a second time when the first sync packet of the plurality of packets is received by the second device, the second time being based on the second clock;
    obtaining a third time when a first response packet from the second device is sent to the first device in response to the first sync packet, the third time being based on the second clock;
    obtaining a fourth time when the first response packet from the second device is received by the first device, the fourth time being based on the first clock;
    computing a first path delay across the channel of the first sync packet and the first response packet;
    determining whether the first path delay satisfies a condition involving the minimum path delay or the mean path delay;
    obtaining a fifth time when a second sync packet of the plurality of packets is sent from the first device to the second device, the fifth time being based on the first clock;
    obtaining a sixth time when the second sync packet of the plurality of packets is received by the second device, the sixth time being based on the second clock;
    obtaining a seventh time when a second response packet from the second device is sent to the first device in response to the second sync packet, the seventh time being based on the second clock;
    obtaining an eighth time when the second response packet from the second device is received by the first device, the eighth time being based on the first clock;
    computing a second path delay across the channel of the second sync packet and the second response packet;
    determining whether the second path delay satisfies the condition involving the minimum path delay or the mean path delay; and
    if at least each of the first path delay and the second path delay satisfies the condition, then:
        computing a first skew between the first time and the fifth time and a second skew between the second time and the sixth time, or computing the first skew between the fourth time and the eighth time and the second skew between the third time and the seventh time;
        computing a ratio based on the first skew and the second skew;
        computing a first difference between the fourth time and the first time and a second difference between the third time and the second time, or computing the first difference between the eighth time and the fifth time and the second difference between the seventh time and the sixth time;
        adjusting one of the first difference or the second difference based on the ratio;
        computing a packet trip delay based on the first difference and the second difference, as adjusted;
        computing an offset between the first clock and the second clock based on the packet trip delay and any of the first time and the second time, the third time and the fourth time, the fifth time and the sixth time, or the seventh time and the eighth time; and
        correcting, based on the offset, the second clock time of the second clock if the second difference is adjusted or the first clock time of the first clock if the first difference is adjusted.

* * * * *